(12) United States Patent
Park et al.

(10) Patent No.: US 12,429,687 B2
(45) Date of Patent: Sep. 30, 2025

(54) CAMERA MODULE

(71) Applicant: LG INNOTEK CO., LTD., Seoul (KR)

(72) Inventors: Tae Bong Park, Seoul (KR); Hyun Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1018 days.

(21) Appl. No.: 17/593,942

(22) PCT Filed: Mar. 30, 2020

(86) PCT No.: PCT/KR2020/004300
§ 371 (c)(1),
(2) Date: Sep. 28, 2021

(87) PCT Pub. No.: WO2020/197349
PCT Pub. Date: Oct. 1, 2020

(65) Prior Publication Data
US 2022/0196888 A1 Jun. 23, 2022

(30) Foreign Application Priority Data
Mar. 28, 2019 (KR) .................. 10-2019-0035682

(51) Int. Cl.
*G02B 26/00* (2006.01)
*G02B 3/14* (2006.01)
(52) U.S. Cl.
CPC ............. *G02B 26/004* (2013.01); *G02B 3/14* (2013.01)
(58) Field of Classification Search
CPC ................................ G02B 3/14; G02B 26/004
See application file for complete search history.

(56) References Cited

U.S. PATENT DOCUMENTS

2012/0026596 A1 2/2012 Berge et al.
2017/0315274 A1* 11/2017 Park ..................... G02B 27/646

FOREIGN PATENT DOCUMENTS

KR 10-0843473 B1 7/2008
KR 10-2018-0087082 A 8/2018
(Continued)

OTHER PUBLICATIONS

International Search Report dated Jul. 1, 2020 in International Application No. PCT/KR2020/004300.

*Primary Examiner* — Wen Huang
(74) *Attorney, Agent, or Firm* — Saliwanchik, Lloyd & Eisenschenk

(57) ABSTRACT

An embodiment comprises: a substrate; a sensor base disposed on the substrate; a lens holder disposed on the sensor base; a lens barrel coupled to the lens holder; and a first lens part disposed inside the lens barrel, wherein: the first lens part comprises a holder, a liquid lens disposed inside the holder and including an upper electrode and a lower electrode, and a terminal disposed in the holder and electrically connected to the upper and lower electrodes; the upper electrode comprises a first upper electrode, a second upper electrode, a third upper electrode, and a fourth upper electrode, which are spaced apart from each other; the lower electrode comprises a first lower electrode, a second lower electrode, a third lower electrode, and a fourth lower electrode, which are spaced apart from each other; and the first lower electrode is a first common electrode for the upper electrode, and the second lower electrode is a second common electrode for the third lower electrode and the fourth lower electrode.

17 Claims, 18 Drawing Sheets

(56) References Cited

FOREIGN PATENT DOCUMENTS

| | | |
|---|---|---|
| KR | 10-2018-0088237 A | 8/2018 |
| KR | 10-1908658 B1 | 12/2018 |
| WO | WO-2018/187591 A2 | 10/2018 |

\* cited by examiner

CAMERA MODULE

CROSS-REFERENCE TO RELATED APPLICATIONS

This application is the U.S. national stage application of International Patent Application No. PCT/KR2020/004300, filed Mar. 30, 2020, which claims the benefit under 35 U.S.C. § 119 of Korean Application No. 10-2019-0035682, filed Mar. 28, 2019, the disclosures of each of which are incorporated herein by reference in their entirety.

TECHNICAL FIELD

Embodiments relate to a camera module and an optical device including the camera module.

BACKGROUND ART

An optical device of a portable device may be required to exhibit high resolution capability, a small size, and various photographing functions. For example, the various photographing functions may mean at least one of a zoom-in/zoom-out function, an auto-focusing (AF) function, a handshaking correction function, and an optical image stabilization (OIS) function.

In order to realize the various photographing functions, technology for assembling a plurality of lenses with each other and directly moving the lens assembly may be used. However, when the number of lenses is increased, the size of the optical device may be increased.

The auto-focusing function and the handshaking correction function may be fulfilled by moving or tilting a plurality of lenses, which are fixed to a lens holder and are arranged in the optical-axis direction, in the direction of the optical axis or a direction perpendicular to the optical axis. To this end, there is need for an additional lens moving apparatus for driving a lens assembly composed of a plurality of lenses. However, because the lens moving apparatus requires a large amount of electric power and because an additional cover glass for protecting the lens assembly may further be provided in addition to a camera module, there is a problem in that the overall size of the camera module is increased. In order to solve this problem, a liquid lens unit, which is configured to perform an auto-focusing function and a handshaking correction function by electrically controlling the curvature of the interface between two kinds of liquids, has been researched.

DISCLOSURE

Technical Problem

Embodiments provide a camera module and an optical device including the camera module, which are capable of controlling the interface of a liquid lens of a first lens unit, of providing electrodes and terminals capable of outputting the output of a temperature sensor, of facilitating an operation of conductively connecting the electrodes of the liquid lens to terminals, and of decreasing the external size of a first lens unit.

Technical Solution

A camera module according to an embodiment includes a circuit board, a sensor base disposed on the circuit board, a lens holder disposed on the sensor base, a lens barrel coupled to the lens holder, and a first lens unit disposed in the lens barrel, wherein the first lens unit includes a holder, a liquid lens, which is disposed in the holder and includes an upper electrode and a lower electrode, and a terminal, which is disposed at the holder and is conductively connected to the upper electrode and to the lower electrode, wherein the upper electrode includes a first upper electrode, a second upper electrode, a third upper electrode, and a fourth upper electrode, which are spaced apart from one another, wherein the lower electrode includes a first lower electrode, a second lower electrode, a third lower electrode, and a fourth lower electrode, wherein the first lower electrode is a first common electrode for the upper electrode, and wherein the second lower electrode is a second common electrode for the third lower electrode and the fourth lower electrode.

The liquid lens may include a first liquid and a second liquid, and a drive signal may be applied between the upper electrode and the first common electrode so as to deform the interface between the first liquid and the second liquid.

The liquid lens may include a heater configured to control the temperature of the liquid lens, and the third lower electrode and the second common electrode may be conductively connected to the heater.

The liquid lens may include a temperature sensor configured to measure the temperature of the liquid lens, and the fourth lower electrode and the second common electrode may be conductively connected to the temperature sensor.

The terminal may include a first terminal connected to the upper electrode and a second terminal connected to the lower electrode.

The terminal may include a connecting terminal connecting the lower electrode to the second terminal.

One end of the first terminal may be coupled to the upper electrode, a remaining end of the first terminal may project from a side surface of the holder, one end of the second terminal may be coupled to the connecting terminal, and a remaining end of the second terminal may project from the side surface of the holder.

The first terminal may include a first portion coupled to the upper electrode, a second portion projecting from the side surface of the holder, and a third portion, which connects the first portion to the second portion and is disposed on the side surface of the holder, and at least a portion of the first portion may overlap at least a portion of the upper electrode in an optical-axis direction.

The second terminal may include a first portion coupled to the connecting terminal, a second portion projecting from the side surface of the holder, and a third portion, which connects the first portion to the second portion and is disposed on the side surface of the holder.

The first terminal may include a first of first terminal and a second of first terminal, which are disposed at one side of the holder, and a third of first terminal and a fourth of first terminal, which are disposed at another side of the holder, and the second terminal may include a first of second terminal and a second of second terminal, which are disposed at the one side of the holder, and a third of second terminal and a fourth of second terminal, which are disposed at the another side of the holder.

The first of second terminal and the second of second terminal may be disposed between the first of first terminal and the second of first terminal, and the third of second terminal and the fourth of second terminal may be disposed between the third of first terminal and the fourth of first terminal.

The camera module may include a second lens unit and a third lens unit, which are disposed in the lens barrel, and the first lens unit may be disposed between the second lens unit and the third lens unit.

A camera module according to another embodiment includes a holder, a liquid lens, which is disposed in the holder and includes a first electrode and a second electrode, and a terminal, which is disposed at the holder and connects the first electrode to the second electrode, wherein the first electrode includes a plurality of first electrodes, which are disposed on one surface of the liquid lens and are spaced apart from each other, wherein the second electrode includes a plurality of second electrodes, which are disposed on the other surface opposite the one surface of the liquid lens and are spaced apart from each other, and wherein one of the second electrodes is a first common electrode for the first electrode and another of the second electrodes is a second common electrode for the other two second electrodes.

The first electrodes may be disposed on the upper surface of the liquid lens, and the second electrodes may be disposed on the lower surface of the liquid lens.

The first electrodes may include a first of first electrode, a second of first electrode, a third of first electrode, and a fourth of first electrode, and the second electrodes may include a first of second electrode, a second of second electrode, a third of second electrode, and a fourth of second electrode, wherein the first of second electrode may be the first common electrode, the second of second electrode may be the second common electrode, and the other two second electrodes may be the third of second electrode and the fourth of second electrode, wherein the terminal may include a first terminal connected to the first electrodes and a second terminal connected to the second electrodes, wherein the first terminal may include a first of first terminal and a second of first terminal, which are disposed at one side of the holder, and a third of first terminal and a fourth of first terminal, which are disposed at another side of the holder, and wherein the second terminal may include a first of second terminal and a second of second terminal, which are disposed at the one side of the holder, and a third of second terminal and a fourth of second terminal, which are disposed at the another side of the holder.

Advantageous Effects

Embodiments are capable of controlling the interface of a liquid lens of a first lens unit, of providing electrodes and terminals capable of outputting the output of a temperature sensor, of facilitating an operation of conductively connecting the electrodes of the liquid lens to terminals, and of decreasing the external size of a first lens unit.

BEST MODE

Figure 1:
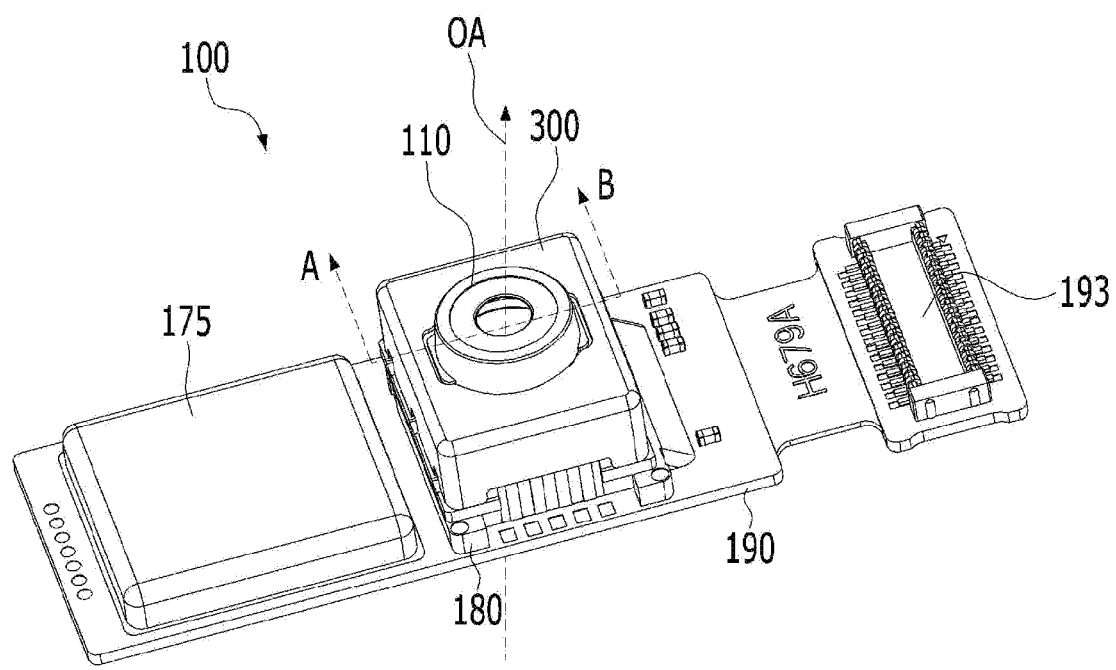
FIG. 1 is a perspective view of a camera module according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, a lens moving apparatus, and a camera module and an optical device each including the lens moving apparatus will be described with reference to the accompanying drawings. For the convenience of description, although the camera module according to an embodiment is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the direction of the optical axis OA, may be referred to as a "first direction", the X-axis direction may be referred to as a "second direction", and the Y-axis direction may be referred to as a "third direction". For example, the optical-axis direction may be a direction parallel to the optical axis OA.

The camera module according to an embodiment of the present invention is capable of performing an "auto-focusing function". Here, the "auto-focusing function" serves to automatically focus an image of a subject on an image sensor surface.

In addition, the camera module according to the embodiment may perform a function of "handshake correction". Here, the function of "handshake correction" may serve to inhibit the contour line of a captured image from being blurred due to vibration caused by shaking of the user's hand when capturing a still image.

Furthermore, the "terminal" may alternatively be referred to as a "pad", an "electrode", a "conductive layer", or a "bonding portion".

Figure 2:
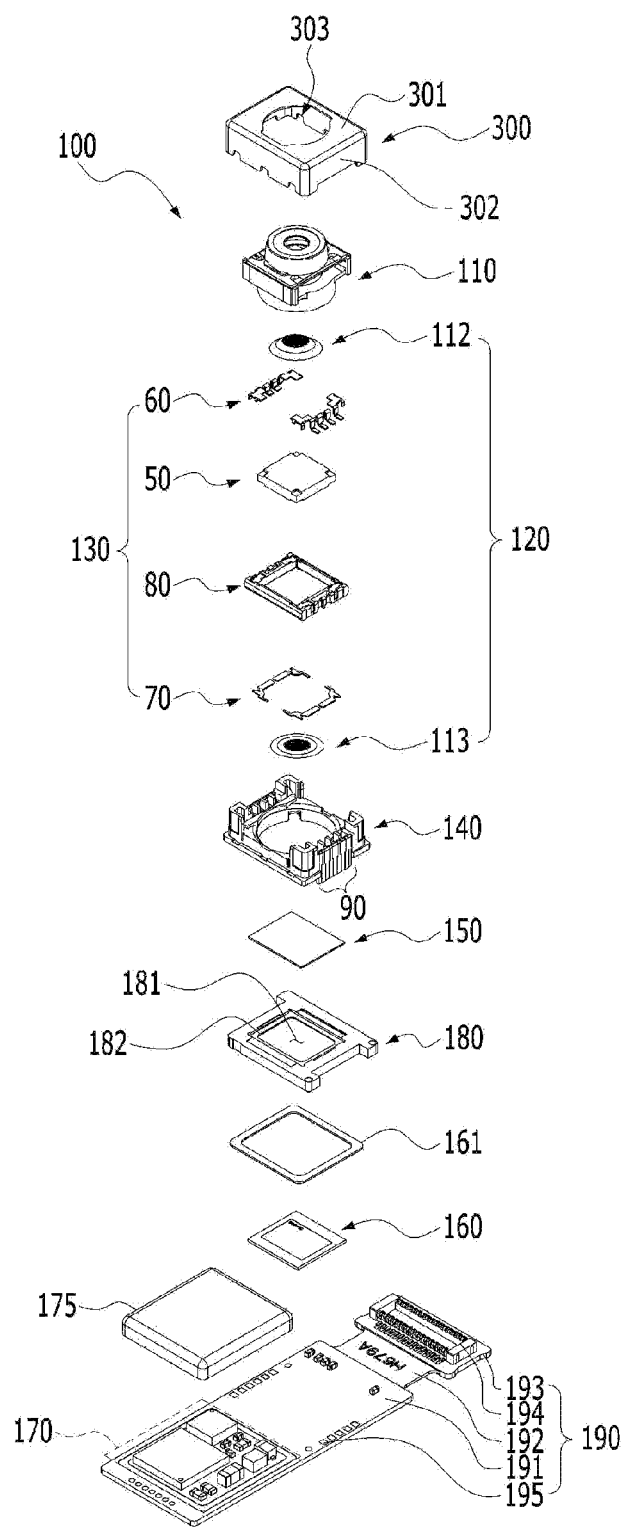
FIG. 2 is an exploded perspective view of the camera module shown in FIG. 1.
Figure 3:
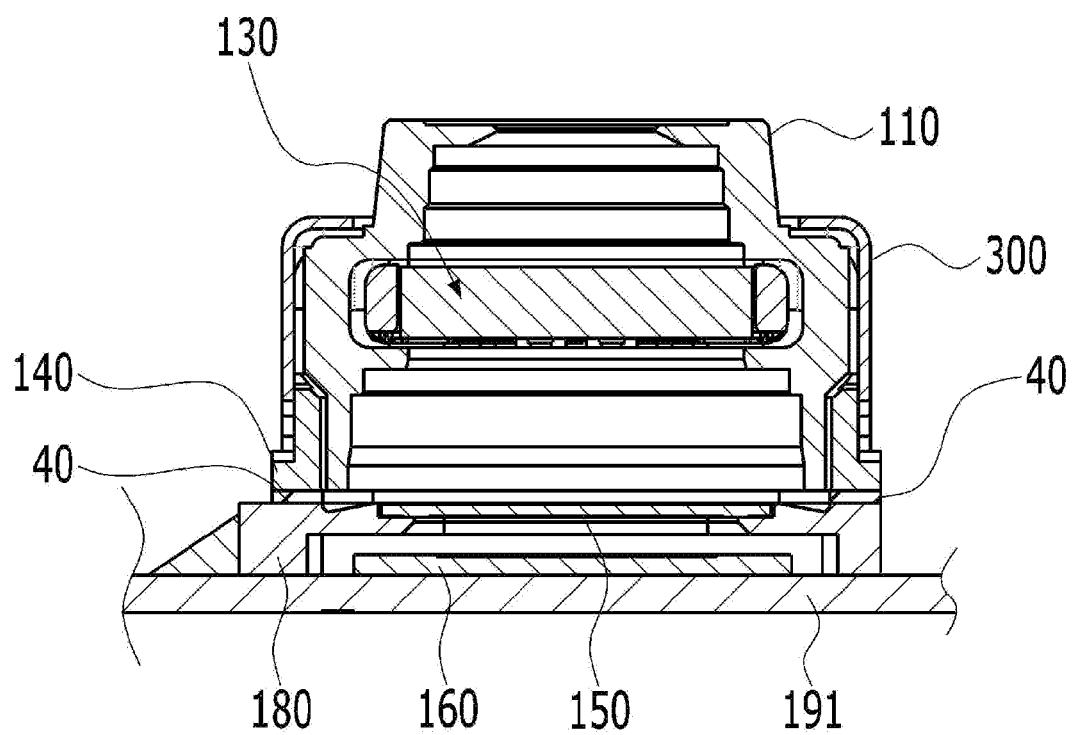
FIG. 3 is a cross-sectional view of the camera module taken along line A-B in FIG. 1.

FIG. 1 is a perspective view of a camera module 100 according to an embodiment. FIG. 2 is an exploded perspective view of the camera module 100 shown in FIG. 1. FIG. 3 is a cross-sectional view of the camera module 100 taken along line A-B in FIG. 1.

Referring to FIGS. 1 to 3, the camera module 100 may include a lens barrel 110 and a lens assembly 120 disposed or mounted to the lens barrel 110. Furthermore, the camera module 100 may include an image sensor 160 disposed under the lens barrel 110.

The camera module 100 may further include a lens holder 140 configured to accommodate the lens barrel 110. The camera module 100 may further include a filter 150. The camera module 100 may further include a sensor base 180 to which the image sensor 160 is disposed or mounted.

The camera module 100 may further include a circuit board 190. The camera module 100 may further include a circuit element 170 disposed or mounted to the circuit board 190. The camera module 100 may further include a cover 300.

The circuit board 190 may be a printed circuit board (PCB).

The circuit board 190 may be disposed under the sensor base 180, and may include a first circuit board 191, a second circuit board 192 connected to the first circuit board 191, a third circuit board 193 connected to the second circuit board 192, and a connector 194 connected to the third circuit board 193.

The camera module 100 may further include a circuit element 170 disposed or mounted to the first circuit board 191. Furthermore, the circuit board 190 may include at least one terminal 195, which is disposed or formed at the first circuit board 191. For example, the terminal 195 of the circuit board 190 may include a plurality of terminals, and the plurality of terminals 195 of the circuit board 190 may be conductively connected to an electric connection member 90.

The sensor base 180 and the image sensor 160 may be disposed at the first circuit board 191. For example, each of the first circuit board 191 and the third circuit board 193 may be a rigid printed circuit board, and the second circuit board 192 may be a flexible printed circuit board, which conductively connects the first circuit board 191 to the third circuit board 193, without being limited thereto. In another embodiment, at least one of the first to third circuit boards may be a rigid printed circuit board or a flexible printed circuit board. In a further embodiment, the first circuit board 191 to the third circuit board 193 may integrally formed into a single integrated circuit board.

The image sensor 160 may be disposed at the circuit board 190. For example, the image sensor 160 may be disposed on the upper surface of the first circuit board 191, and may be conductively connected to the circuit board 190.

The optical axis of the image sensor 160 and the optical axis of the lens assembly may be aligned with each other. The image sensor 160 may include an effective image area (or an active area), and may convert the light radiated to the effective area (or the active area) into an electric signal.

The circuit element 170 may be conductively connected to the first circuit board 191, and may constitute a controller configured to control the image sensor 160 and a first lens unit 130. For example, the circuit element 170 may include at least one of a capacitor, a sensor, an integrated circuit (IC), and the like.

The camera module 100 may further include a cover 175, which is disposed on the first circuit board 191 and covers the circuit element 170 in order to protect the circuit element 170.

The sensor base 180 may be disposed at the circuit board 190. For example, the sensor base 180 may be disposed on the upper surface of the first circuit board 191, and may be attached or coupled to the upper surface of the first circuit board 191. For example, the sensor base 180 may be disposed between the circuit board 190 and the lens holder 140.

The camera module 100 may include an adhesive 161, which is disposed between the sensor base 180 and the circuit board 190 so as to attach or fix the sensor base 180 to the upper surface of the circuit board 190.

The sensor base 180 may surround the image sensor 160 in order to protect the image sensor 160 from external contaminants and impacts, and may have therein a bore 181 through which the effective image area (or the active area) of the image sensor 160 is exposed.

The upper surface of the sensor base 180 may be provided with a seating portion 182 in which the filter 150 is seated. The seating portion 182 may have a height difference in the optical-axis direction with respect to the upper surface of the sensor base 180, and may be configured to surround the bore 181.

A portion of the lower surface of the sensor base 180 may be depressed so as to define a space or a seating groove (not shown), in which the image sensor 160 is disposed.

The sensor base 180 may be disposed at the first circuit board 191 so as not to overlap the circuit board 170 in the optical-axis direction and so as to be spaced apart from the circuit element 170. In another embodiment, the sensor base 180 may be omitted.

The filter 150 may be disposed at the sensor base 180. For example, the filter 150 may be disposed in the seating portion 182 in the sensor base 180, and may be positioned in the effective area (or the active area) of the image sensor 160.

The filter 150 may be disposed between the lens assembly 120 and the image sensor 160 so as to filter light within a specific wavelength range that passes through the lens assembly 120. For example, although the filter 150 may be an infrared (IR)-screening filter for blocking infrared radiation or a ultraviolet (UV)-screening filter for blocking ultraviolet radiation, the disclosure is not limited thereto.

The lens holder 140 may be disposed on the circuit board 190. For example, the lens holder 140 may be disposed on the sensor base 180. For example, the lower surface of the lens holder 140 may be coupled to the upper surface of the sensor base 180. The lens holder 140 may be disposed in the cover 300. The lens holder 140 may be made of an insulation material.

The lens holder 140 may be disposed between the liquid assembly 120 and the circuit board 190. For example, the lens holder 140 may be disposed between the first lens unit 130 and the first circuit board 191.

The lens holder 140 may be provided with the electric connection member 90, through which drive signals (for example, drive voltages) supplied from the circuit board 190 are transmitted to the first lens unit 130 and a signal pertaining to temperature detection output from the first lens unit 130 is transmitted to the circuit board.

A first adhesive 40 may be disposed between the sensor base 180 and the lens holder 140 so as to couple the sensor base 180 to the lens holder 140.

For example, the first adhesive 40 may be disposed between the upper surface of the sensor base 180 and the lower surface of the lens holder 140. For example, the first adhesive 40 may be disposed between the side surface of the sensor base 180 and the lens holder 140. The first adhesive 40 may seal the gap between the sensor base 180 and the lens holder 140.

The camera module according to an embodiment may further include a second adhesive for bonding the lens barrel 110 to the lens holder 140 and a third adhesive for bonding the holder 80 of the first lens unit 130 to the lens holder 140, in addition to the first adhesive 40.

The lens assembly 120 may be mounted or disposed at the lens barrel 110. The lens assembly 120 may alternatively be referred to as a "lens module".

The lens assembly 120 may include the first lens unit 130 including a liquid lens. For example, the lens assembly 120 may include the first lens unit 130, a second lens unit 112, and a third lens unit 113.

The first lens unit 130 may include an "optical unit" capable of collecting an input-light signal, which is reflected by a subject, through a single lens, and of transmitting the signal to the image sensor 160.

For example, the first lens unit 130 may include a variable lens. The variable lens may be a convertible lens. Furthermore, the variable lens may be a lens having a focus capable of being controlled.

The variable lens may be at least one of a liquid lens, a polymer lens, a liquid crystal lens, a voice coil motor (VCM)-type lens, and a shape memory alloy (SMA)-type lens.

Here, the liquid lens may include a liquid lens including a single kind of liquid and a liquid lens including two kinds of liquids. The liquid lens including a single kind of liquid may change the focus by controlling a membrane disposed at a position corresponding to the liquid. For example, the liquid lens may change the focus by pressing the membrane using the electromagnetic force between a magnet and a coil. The liquid lens including two kinds of liquids may include a conductive liquid and a nonconductive liquid, and may control the interface defined between the conductive liquid and the nonconductive liquid using a voltage applied to the liquid lens.

Here, the polymer lens may change the focus of a high-molecular-weight material by means of a drive unit such as a piezo drive. The liquid crystal lens may change the focus by controlling a liquid crystal using electromagnetic force. The VCM-type lens may change the focus by controlling a solid lens or a lens assembly including a solid lens using the electromagnetic force between a magnet and a coil. An SMA-type lens may change the focus by controlling a solid lens or a lens assembly including a solid lens using a shape-memory alloy. The optical unit may include a filter, through which light within a specific wavelength range is transmitted. For example, the filter, through which light within a specific wavelength range is transmitted, may include an IR pass filter. Furthermore, the optical unit may include an optical plate. For example, the optical plate may be a light transmission plate.

The controller of the camera module or the controller of an optical device 200A may control the variable lens of the optical unit to shift an input light signal on the image sensor by a predetermined moving distance. The controller may shift the light path of an input light signal using the variable lens of the optical unit.

For example, the first lens unit 130 may alternatively be referred to as a "liquid lens unit", the second lens unit 112 may alternatively be referred to as a "first solid lens unit", and the third lens unit 113 may alternatively be referred to as a "second solid lens unit".

In another embodiment, at least one of the second and third lens assemblies 111 and 112 of the lens assembly may be omitted. In a further embodiment, the lens assembly 120 may include the lens barrel 110 shown in FIG. 2.

The first lens unit 130 may include a liquid lens 50.

Figure 4:
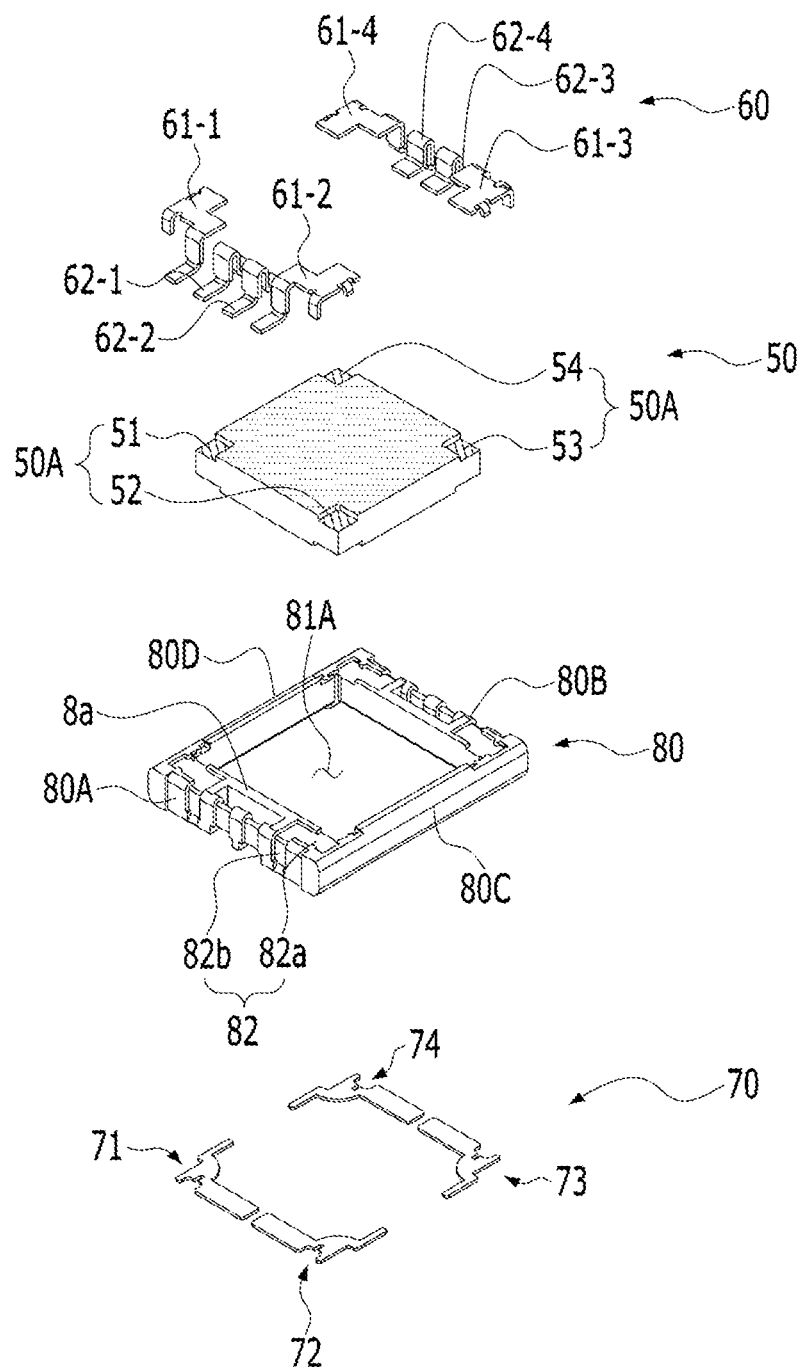
FIG. 4 is an exploded perspective view of a first lens unit.
Figure 5:
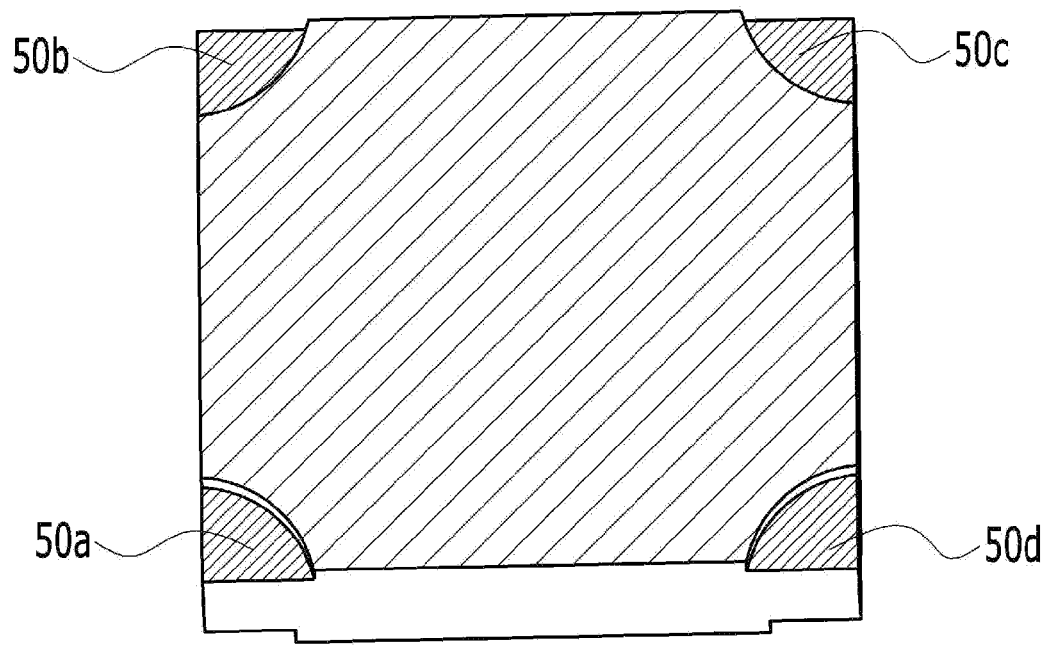
FIG. 5 is a bottom view of the liquid lens shown in FIG. 4.
Figure 6:
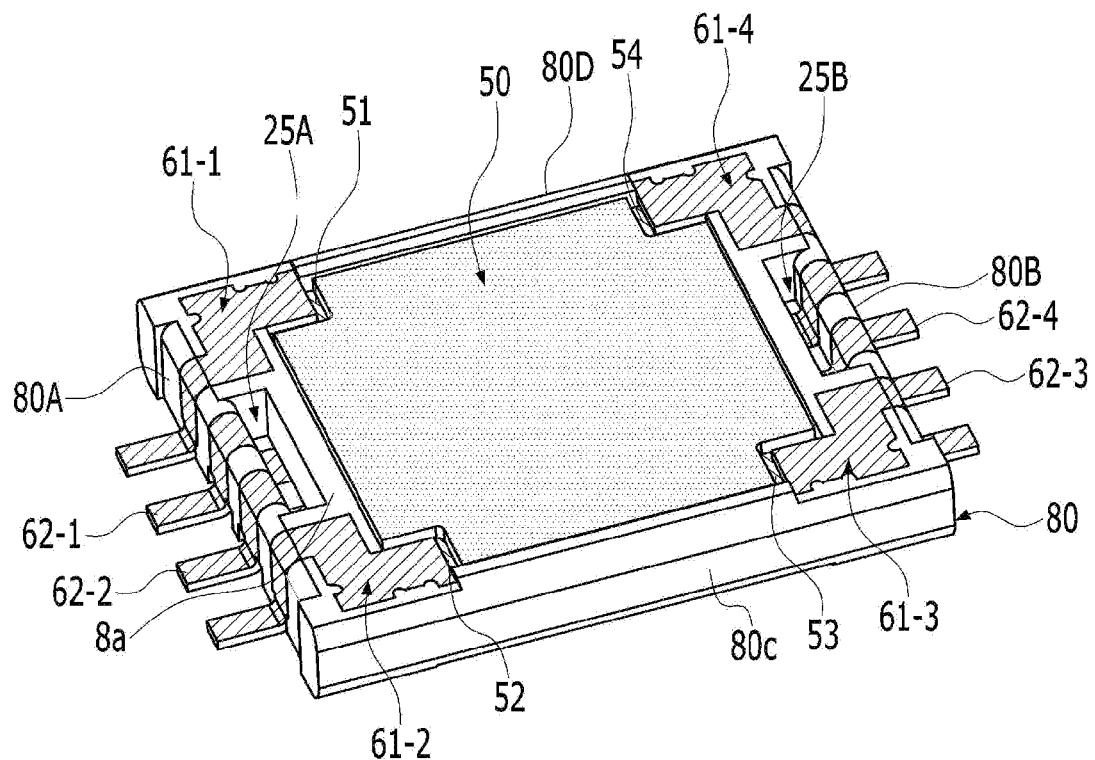
FIG. 6 is a top view of the first lens unit.
Figure 7A:
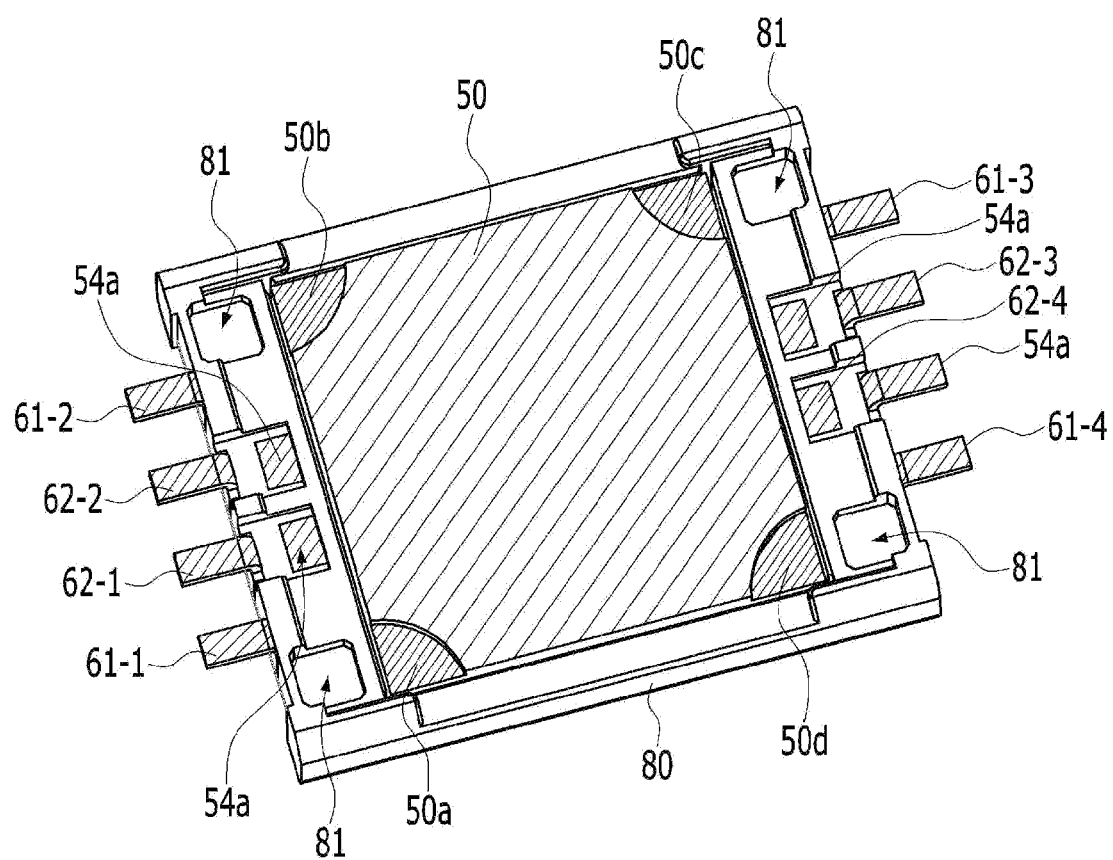
FIG. 7A is a bottom view of the first lens unit excluding a connector.
Figure 7B:
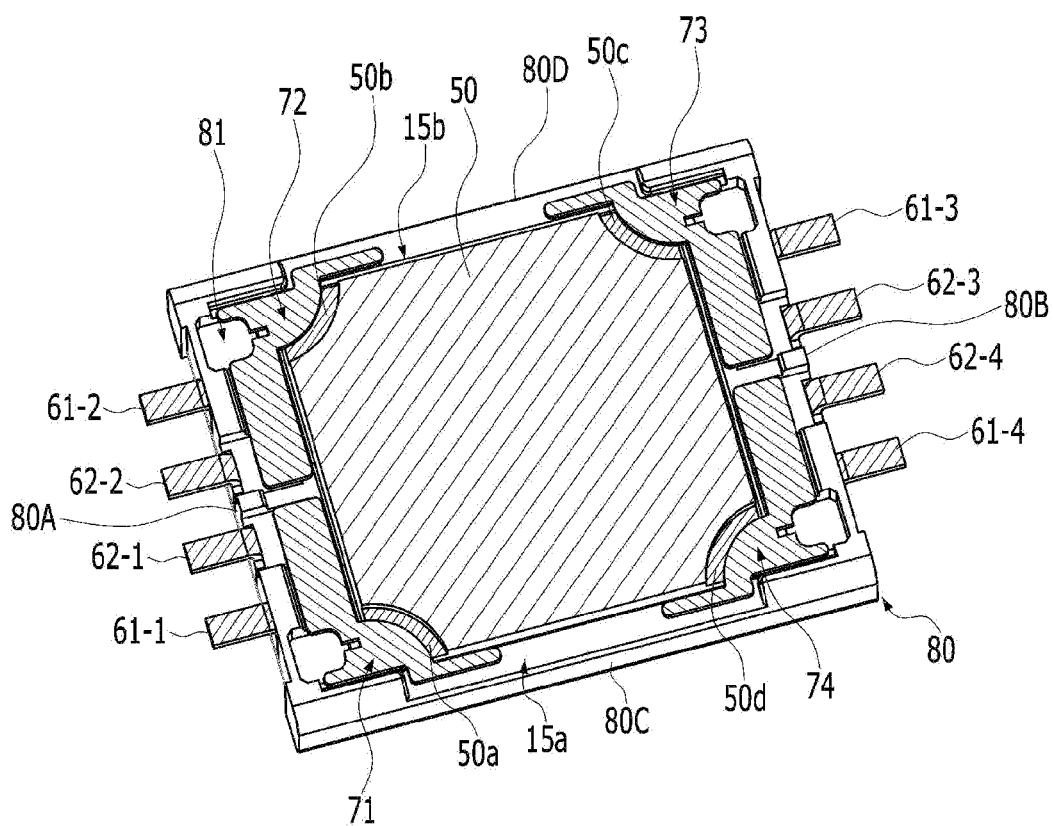
FIG. 7B is a bottom view of the first lens unit.

FIG. 4 is an exploded perspective view of the first lens unit 130. FIG. 5 is a bottom view of the liquid lens 50 shown in FIG. 4. FIG. 6 is a top view of the first lens unit 130. FIG. 7A is a bottom view of the first lens unit 130 excluding the connector 70. FIG. 7B is a bottom view of the first lens unit 130.

Referring to FIGS. 4 and 7B, the first lens unit 130 may include the liquid lens 50, a terminal portion or terminal 60, a connector 70, and the holder 80. In another embodiment, the first lens unit may exclude at least one of the terminal portion 60, the connector 70, and the holder 80.

The liquid lens 50 may be disposed between the lens of the second lens unit 112 and the lens of the third lens unit 113 so as to be spaced apart both from the lens of the second lens unit 112 and from the lens of the third lens unit 113 in the optical-axis direction.

The liquid lens 50 may include a liquid lens region including different kinds of liquids, an upper electrode 50A, and a lower electrode 50B.

The liquid lens region may include a first conductive liquid and a second nonconductive liquid, and an interface may be formed between the first liquid and the second liquid.

The liquid lens 50 may include at least one heater configured to generate heat in response to a drive signal (or a control signal). Although the heater may be embodied as a resistor capable of generating heat in response to a drive signal (or a control signal), the disclosure is not limited thereto.

For example, the liquid lens 50 may include a heater (not shown) configured to generate heat in response to a heater drive signal (or a heater control signal).

Furthermore, the liquid lens 50 may include a temperature sensor (not shown) configured to detect the temperature of the liquid lens 50. The temperature sensor of the liquid lens 50 may output a detection signal (or an output signal) corresponding to the result of detection of the temperature of the liquid lens 50.

The upper electrode 50A may be disposed on one surface (for example, the upper surface) of the liquid lens 50, and the lower electrode 50B may be disposed on the other surface (for example, the lower surface) of the liquid lens 50 opposite the one surface of the liquid lens 50.

The upper electrode 50A may include first to fourth upper electrodes 51 to 54, which are spaced apart from one another, and the first to fourth upper electrodes 51 to 54 may be separate terminals or separate electrodes.

The first to fourth upper electrodes 51 to 54 may be disposed around the region of the liquid lens in order to deform the interface between the first liquid and the second liquid. For example, a drive signal may be supplied between the upper electrode 50A and a first common electrode in order to deform the interface between the first liquid and the second liquid.

For example, each of the first to fourth upper electrodes 51 to 54 may be formed or disposed at a corresponding one of the four corners of the first surface (for example, the upper surface) of the liquid lens 50.

The upper surface of each of the first to fourth upper electrodes 51 to 54 may be exposed from the first surface (for example, the upper surface) of the liquid lens 50. For example, although the upper surface of each of the first to fourth upper electrodes 51 to 54 may have a height difference with respect to the upper surface of the liquid lens 50 in the optical-axis direction, the disclosure is not limited thereto. For example, the height of the upper surface of each of the first to fourth upper electrodes 51 to 54 may be lower than the height of the upper surface of the liquid lens 50.

The first to fourth upper electrodes 51 to 54 may be conductively isolated from one another, and respective drive signals may be supplied to the first to fourth upper electrodes 51 to 54. For example, the first to fourth electrodes 51 to 54 may be separate independent electrodes, and independent drive signals may be respectively supplied to the first to fourth upper electrodes 51 to 54.

For example, a first drive signal (or a first control signal) may be applied between the first upper electrode 51 and the first common electrode, and a second drive signal (or a second control signal) may be applied between the second upper electrode 52 and the first common electrode. Furthermore, a third drive signal (or a third control signal) may be applied between the third upper electrode 53 and the first common electrode, and a fourth drive signal (or a fourth control signal) may be applied between the fourth upper electrode 54 and the first common electrode. For example, the first common electrode may be a first lower electrode 50a.

For example, each of the first to fourth drive signals may be of a voltage type or a current type. Here, each of the first to fourth upper electrodes 51 to 54 may be a separate positive (+) electrode for controlling the liquid lens 50, and a first lower electrode 50a, which is one of the first to fourth lower electrodes 50a to 50d, may be a common negative (−) electrode for controlling the liquid lens.

The liquid lens 50 may be configured such that the interface defined between the first liquid (for example, a conductive liquid) and the second liquid (for example, a nonconductive liquid) is deformed by first to fourth drive signals, and the focal length of the liquid lens 50 may be adjusted by the deformed interface. Consequently, it is possible to perform at least one of an AF function and an OIS function of the lens assembly 120.

The lower electrode 50B may include first to fourth lower electrodes 50a to 50d.

The first to fourth lower electrodes 50a to 50d may be exposed from the second surface of the liquid lens 50. Here, the second surface of the liquid lens 50 may be the surface of the liquid lens 50 opposite the first surface.

The lower electrode 50B may include the lower electrodes 50a to 50d, which are formed at the four corners of the second surface (for example, the lower surface) of the liquid lens 50. For example, the first to fourth lower electrodes 50a to 50d may be separate electrodes or separate terminals.

As described above, one of the first to fourth lower electrodes 50a to 50d (for example, the first lower electrode 50a) may be a first common electrode, for example, a common negative (−) electrode for the first to fourth upper electrodes 51 to 54 for controlling the liquid lens. For example, although a ground voltage may be supplied to the first common electrode (for example, 50a), the disclosure is not limited thereto.

Another of the first to fourth lower electrodes 50a to 50d (for example, the third lower electrode 50c) may be conductively connected to the heater of the liquid lens 50, and a heater drive signal (or a heater control signal) may be supplied to the third lower electrode 50c.

For example, one (for example, 50c) of the third and fourth lower electrodes 50c and 50d may be a positive (+) electrode for receiving a heater drive signal. For example, the third lower electrode 50c and the second common electrode may be conductively connected to the heater, and the heater drive signal may be applied through the third lower electrode 50c and the second common electrode.

Another of the first to fourth lower electrodes 50a to 50d (for example, the fourth lower electrode 50d) may be conductively connected to the temperature sensor of the liquid lens 50, and the detection signal of the temperature sensor may be output through the fourth lower electrode 50d.

For example, the other of the third and fourth lower electrodes 50c and 50d (for example, 50d) may be a positive (+) electrode for outputting the detection signal of the temperature sensor. For example, the fourth lower electrode and the second common electrode may be conductively connected to the temperature sensor, and the detection signal of the temperature sensor may be output through the fourth lower electrode 50d and the second common electrode.

The remaining one of the first to fourth lower electrodes 50a to 50d (for example, the second lower electrode 50b) may be a second common electrode for the heater drive signal for the heater and the detection signal from the temperature sensor. For example, although a ground voltage may be supplied to the second common electrode (for example, 50b), the disclosure is not limited thereto.

For example, although the first common electrode (for example, 50a) and the second common electrode (for example, 50b) may be conductively and physically separated or isolated from each other, the disclosure is not limited thereto. In another embodiment, the first common electrode and the second common electrode may be connected to each other or may be integrally formed.

According to the embodiment, epoxy may be applied through the spaces between the liquid lens 50 and the solid lenses of the second and third lens units 112 and 113, and active alignment of the liquid lens 50 may be performed.

In another embodiment, the upper electrode 50A and the lower electrode 50B of the liquid lens 50 may fulfill the opposite functions or roles. In other words, the lower electrodes may be separate terminals for serving as the above-described upper electrodes. Specifically, one of the upper electrodes (for example, the third upper electrode) may be a separate terminal for the heater, and another of the upper electrodes (for example, the fourth upper electrode) may be a separate terminal for the temperature sensor. Another of the upper electrodes (for example, the first upper electrode) may be the first common terminal for the lower electrodes, which are separate terminals, and the remaining one of the upper electrodes (for example, the second upper electrode) may be the second common terminal for the separate electrodes (for example, the third and fourth upper electrodes) for the heater and the temperature sensor. Here, the connector 70 may connect the upper electrodes to the terminals 62-1 to 62-4 of the terminal portion 60 to one another.

Although the upper electrode 50A and the lower electrode 50B may be made of a conductive member, for example, a conductive metal, the disclosure is not limited thereto.

The upper electrode 50A may alternatively be referred to as a "first electrode". The first upper electrode 51 may alternatively be referred to as a "first of first electrode", and the second upper electrode 52 may alternatively be referred to as a "second of first electrode". The third upper electrode 53 may alternatively be referred to as a "third of first electrode", and the fourth upper electrode 54 may alternatively be referred to as a "fourth of first electrode".

Furthermore, the lower electrode 50B may alternatively be referred to as a "second electrode". The first lower electrode 50a may alternatively be referred to as a "first of second electrode", and the second lower electrode 50b may alternatively be referred to as a "second of second electrode". The third lower electrode 50c may alternatively be referred to as a "third of second electrode", and the fourth lower electrode 50d may alternatively be referred to as a "fourth of second electrode".

The holder 80 may receive or support the liquid lens 50, the terminal portion 60, and the connector 70. The holder 80 may have therein a hole 81A configured to receive the liquid lens 50. For example, the hole 81A may be formed through the holder 80 in the optical-axis direction. The liquid lens 50 may be disposed or seated in the hole 81A in the holder 80.

The holder 80 may have a shape capable of being mounted to a first barrel portion 110A of the lens barrel 110.

The holder 80 may have therein a groove 82, in which the terminal portion 60 is disposed or seated. For example, the holder 80 may have a plurality of grooves 82, and each of the plurality of grooves 82 may have the same shape as a corresponding one of terminals 61-1 to 61-4 and 62-1 to 62-4 of the terminal portion 60.

For example, the groove 82 may have a first groove 82a formed in the upper surface 8a of the holder 80. A portion of the terminal portion 60 may be disposed in the first groove 82a. The first groove 82a may be configured to have a shape corresponding to a portion of the terminal portion 60.

The groove 82 in the holder 80 may further have a second groove 82b formed in the side surfaces 80A and 80B of the holder 80. For example, the second groove 82b may communicate with or be contiguous with the first groove 82a.

Another portion of the terminal portion 60 may be disposed in the second groove 82b. The second groove 82b may be configured to have a shape corresponding to the another portion of the terminal portion 60.

Referring to FIG. 5, the terminal portion 60 may be disposed at the holder 80.

At least a portion of the terminal portion 60 may be disposed on the side surface of the holder 80. For example, the at least a portion of the terminal portion 60 may be disposed in the groove 82 in the holder 80.

Although the terminal portion may be a structure in which a separate terminal or conductor is coupled or bonded to the holder 80, the disclosure is not limited thereto. In another embodiment, the terminal portion 60 and the holder 80 may be integrally formed through insert injection molding.

The terminal portion 60 may be conductively connected to the liquid lens 50.

For example, the terminal portion 60 may be connected to at least one of the upper electrode 50A and the lower electrode 50B of the liquid lens 50 via a conductive adhesive. For example, the conductive adhesive may include at least one of solder and a conductive adhesive (for example, conductive epoxy).

The terminal portion 60 may include a first terminal, which is conductively connected to the upper electrode 50A, and a second terminal, which is conductively connected to the lower electrode 50B.

For example, the first terminal portion (or the first terminal) may include a first of first terminal 61-1 to a fourth of first terminal 61-4, which are connected to the first to fourth upper electrodes 51 to 54. One end of the first terminal portion (or the first terminal) may be coupled to the upper electrode 50A, and the other end of the first terminal portion (or the first terminal) may project from the side surface of the holder 80.

The first terminal portion (of the first terminal) may include a first portion, which is coupled to the upper electrode 50A, a second portion, which projects from a side surface, and a third portion, which connects the first portion to the second portion of the first terminal portion and which is disposed on the side surface of the holder, and at least a portion of the first portion may overlap at least a portion of the upper electrode in the optical-axis direction.

The second terminal (or the second terminal) may include a first of second terminal 62-1 to a fourth of second terminal 62-4, which are conductively connected to the first to fourth lower electrodes 50a to 50d. One end of the second terminal portion (or the second terminal) may be coupled to the connector 70, and the other end of the second terminal portion (or the second terminal) may project from a side surface of the holder 80.

The second terminal portion (or the second terminal) may include a first portion, which is coupled to the connector 70, a second portion, which projects from the side surface of the holder 80, and a third portion, which connects the first portion to the second portion of the second terminal portion and which is disposed on the side surface of the holder 80.

In the first of first terminal 61-1 to the fourth of first terminal 61-4, the term "terminal" may be interchangeably used with "first connecting electrode (or a first electrode)", "first connecting terminal (or a first terminal), or "first connecting circuit board (or a first circuit board)". Furthermore, in the first of second terminal 62-1 to the fourth of second terminal 62-4, the term "terminal" may be interchangeably used with "second connecting electrode (or a second electrode)", "second connecting terminal (or a second terminal)", or "second connecting circuit board (or a second circuit board)".

For example, the first of first terminal 61-1 may be connected to the first upper electrode 51, and the second of first terminal 61-2 may be connected to the second upper electrode 52. The third of first terminal 61-3 may be connected to the third upper electrode 53, and the fourth of first terminal 61-4 may be connected to the fourth upper electrode 54.

For example, the first of second terminal 62-1 may be connected to the first lower electrode 50*a*, and the second of second terminal 62-2 may be connected to the second lower electrode 50*b*. The third of second terminal 62-3 may be connected to the third lower electrode 50*c*, and the fourth of second terminal 62-4 may be connected to the fourth lower electrode 50*d*.

The terminal portion 60 may project from the side surfaces 80A and 80B of the holder 80.

For example, one end each of the first of first and second of first terminals 61-1 and 61-2 and the first of second and second of second terminals 62-1 and 62-2 may project from the first side surface 80A of the holder 80, and one end of each of the third of first and fourth of first terminals 61-3 and 61-4 and the third of second and fourth of second terminals 62-3 and 62-4 may project from the second side surface 80B of the holder 80.

For example, the first of second terminal 62-1 and the second of second terminal 62-2 may be disposed between the first of first terminal 61-1 and the second of first terminal 61-2, and the third of second terminal 62-3 and the fourth of second terminal 62-4 may be disposed between the third of first terminal 61-3 and the fourth of first terminal 61-4.

The terminal portion 60 may be spaced apart from the electric connection member 90.

By means of a conductive adhesive, one end of each of the first of first to fourth of first terminals (for example, 61-1 to 61-4) of the terminal portion 60 may be coupled to a corresponding one of the upper electrodes 51 to 54 of the liquid lens 50, and the other end of each of the first of first to fourth of first terminals (for example, 61-1 to 61-4) of the terminal portion 60 may be coupled to a corresponding one of the electric connection portions 91-1 to 91-4 of the electric connection member 90.

Furthermore, by means of a conductive adhesive, one end of each of the first of second to fourth of second terminals (for example, 62-1 to 62-4) of the terminal portion 60 may be coupled to a corresponding one of the lower electrodes 50*a* to 50*d* of the liquid lens 50, and the other end of each of the first of second to fourth of second terminals (for example, 62-1 to 62-4) of the terminal portion 60 may be coupled to a corresponding one of the electric connection portions 92-1 to 92-4 of the electric connection member 90.

The other end of the terminal portion 60 may project from the holder 80.

The other end of the terminal portion 60 may be spaced apart from the electric connection member 90 so as to overlap the electric connection member 90 in a vertical direction or in the optical-axis direction, and a conductive adhesive may be applied between the other end of the terminal portion and the electric connection member 90. The vertical direction may be parallel to the optical-axis direction.

The terminal portion 60 may include the plurality of terminals 61-1 to 61-4 and 62-1 to 62-4.

For example, four terminals 61-1, 61-2, 62-1 and 62-2 may be disposed on a first side surface of the liquid lens unit 130, and the other four terminals 61-3, 61-4, 62-3 and 62-4 may be disposed on a second side surface of the first lens unit 130 opposite the first side surface of the first lens unit 130.

For example, the four terminals 61-1, 61-2, 62-1 and 62-2 may be disposed at one side or the first side surface 80A of the holder 80, and the other four terminals 61-3, 61-4, 62-3 and 62-4 may be disposed at the other side or the second side surface 80B of the holder 80. The second side surface 80B of the holder 80 may be positioned opposite the first side surface 80A of the holder 80.

Here, the electric connection member 90 may include a plurality of electric connection portions 91-1 to 91-4 and 92-1 to 92-4.

For example, each of the electric connection portions 91-1 to 91-4 and 92-1 to 92-4 may be coupled to a corresponding one of the terminals 61-1 to 61-4 and 62-1 to 62-4 of the terminal portion 60 via the conductive adhesive 69 (see FIG. 11A), and may be conductively connected thereto.

Each of the first of first to fourth of first terminals 61-1 to 61-4 of the terminal portion 60 may be coupled and conductively connected to a corresponding one of the first to fourth upper electrodes 51 to 54 of the liquid lens 50.

Each of the first of second to fourth of second terminals 62-1 to 62-4 of the terminal portion 60 may be conductively connected to a corresponding one of the first to fourth lower electrodes 50*a* to 50*d* of the liquid lens 50.

For example, each of the first of second to fourth of second terminals 62-1 to 62-4 of the terminal portion 60 may be coupled to a corresponding one of the connecting terminals 71 to 74 of the connector 70.

By means of a conductive adhesive, one end of each of the connecting terminals 71 to 74 of the connector 70 may be coupled to a corresponding one of the first of second to fourth of second terminals 62-1 to 62-4, and the other end of each of the connecting terminals 71 to 74 of the connector 70 may be coupled to a corresponding one of the first to fourth lower electrodes 50*a* to 50*d* of the liquid lens 50.

For example, the first connecting terminal 71 may connect the first of second terminal 62-1 to the first lower electrode 50*a* of the liquid lens 50, and the second connecting terminal may connect the second of second terminal 62-2 to the second lower electrode 50*b* of the liquid lens 50.

The third connecting terminal 73 may connect the third of second terminal 62-3 to the third lower electrode 50*c* of the liquid lens 50, and the fourth connecting terminal 74 may connect the fourth of second terminal 62-4 to the fourth lower electrode 50*d* of the liquid lens 50.

Each of the terminals 61-1 to 61-4 and 62-1 to 62-4 may include a first portion (a first coupler), which is disposed at the holder 80, and a second portion (a second coupler), which extends and projects outwards from the first portion. For example, the first coupler and the second coupler may be connected to each other, and a curved or bent portion may be provided between the first coupler and the second coupler.

Figure 8A:
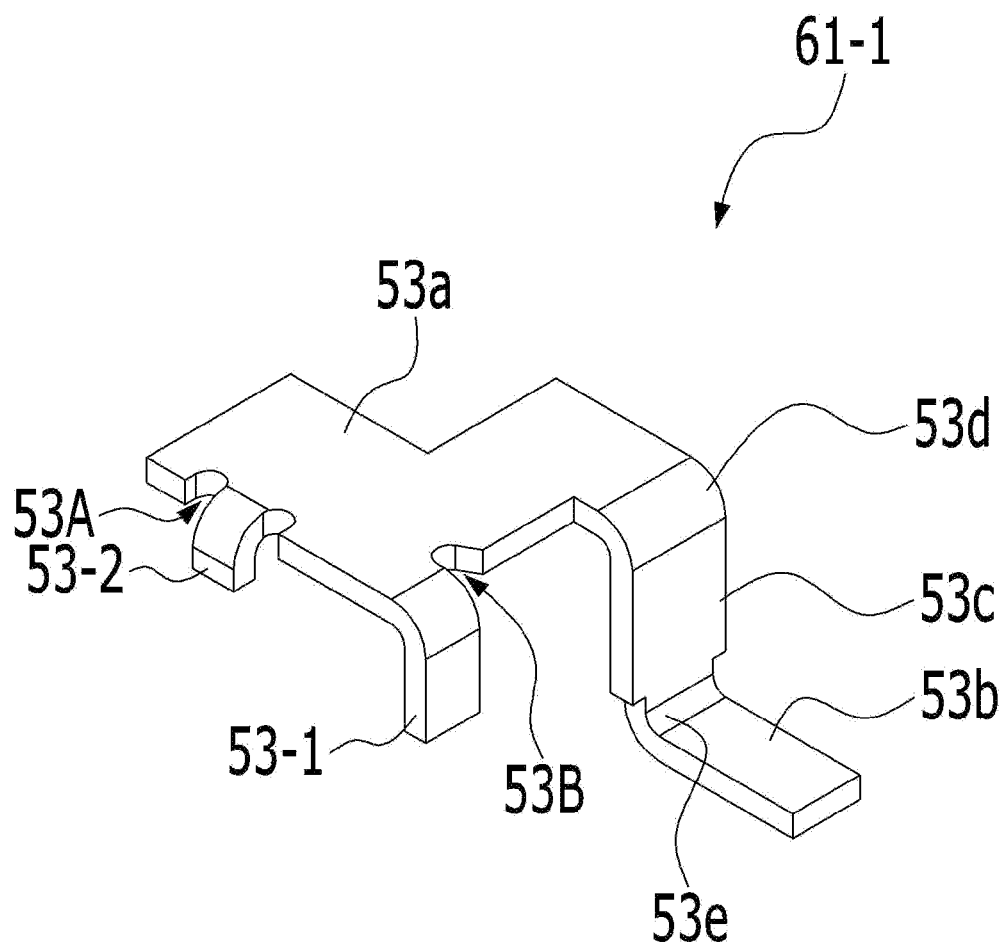
FIG. 8A is a perspective view of a first of first terminal.

FIG. 8A is a perspective view of the first of first terminal 61-1. The description of the first of first terminal 61-1 shown in FIG. 8A may be applied to each of the second of first to fourth of first terminals 61-2 to 61-4, with or without modification.

Referring to FIG. 8A, the first of first terminal 61-1 may include a first portion (or a first coupler) 53*a*, which is connected or coupled to the first upper electrode 51, a second portion (or a second coupler) 53*b*, which is connected or coupled to the first electric connection portion 91-1 of the electric connection member 90, and a third portion (or a third coupler) 53c, which connects the first portion 53a to the second portion 53b.

For example, each of the first of first to fourth of first terminals 61-1 to 61-4 of the terminal portion 60 may include the first portion (or the first coupler) 53a, which is connected to a corresponding one of the first to fourth upper electrodes 51 to 54 of the liquid lens 50, the second portion (or the second coupler) 53b, which is connected to a corresponding one of the first to fourth electric connection portions 91-1 to 91-4 of the electric connection member 90, and the third portion 53c (or the connector) 53c, which connects the first portion 53a to the second portion 53b.

The second portion 53b may project from the side surface 80A or 80B of the holder 80, and may be coupled to the electric connection portion 91-1 via a conductive adhesive.

The first portion 53a of each of the terminals 61-1 to 61-4 may be disposed on the upper surface 8a of the holder 80, and may extend to a corresponding one of the first to fourth upper electrodes 51 to 54 of the liquid lens 50.

For example, at least a portion of the first portion 53a of each of the terminals 61-1 to 61-4 may overlap a corresponding one of the first to fourth upper electrodes 51 to 54 of the liquid lens 50 in the optical-axis direction.

The third portion 53c may be disposed on the side surface 80A or 80B of the holder 80. The third portion 53c may be connected at one end thereof to one end of the first portion 53a and at the other end thereof to one end of the second portion 53b.

Each of the first of first to fourth of first terminals 61-1 to 61-4 may further include a first bent portion 53d. The first bent portion 53d may connect one end of the first portion 53a to one end of the third portion 53c, and may be bent toward the side surface 80A or 80B of the holder 80 from the upper surface 8a of the holder 80.

Each of the first to first to fourth of first terminals 61-1 to 61-4 may include a second bent portion 53e. The second bent portion 53e may connect the other end of the third portion 53c to one end of the second portion 53b, and may be bent toward the outside of the holder 80 from the side surface 80A or 80B of the holder 80.

For example, although the third portion 53c may define a right angle relative to the first portion 53a and the second portion 53b, the disclosure is not limited thereto.

Each of the first of first to fourth of first terminals 61-1 to 61-4 may be disposed at a corresponding one of the corners of the upper surface of the holder 80.

For example, the first portion 53a of each of the first of first to fourth of first terminals 61-1 to 61-4 may be disposed at a corresponding one of the corners of the upper surface of the holder 80.

For example, although the first portion 53a may have a shape that is bent once, for example, an "L" shape, the disclosure is not limited thereto.

The first of first terminal 61-1 may include one or more extensions 53-1 and 53-2, which are bent at the first portion 53a and extend therefrom. Although the first of first terminal 61-1 is shown as including two extensions 53-1 and 53-2 in FIG. 8A, the disclosure is not limited thereto. In another embodiment, the first of first terminal 61-1 may include at least one extension.

For example, the first of first terminal 61-1 may include the first extension 53-1, which is bent at one side surface of the first portion 53a and extends downwards, and the second extension 53-2, which is bent at another side surface of the first portion 53a and extends downwards.

The first and second extensions 53-1 and 53-2 may be positioned in the holder 80 so as to be surrounded by the holder 80. For example, although the first and second extensions 53-1 and 53-2 may not be exposed to the outside of the holder 80, the disclosure is not limited thereto. In another embodiment, at least portions of the first and second extensions may be exposed to the outside of the holder 80.

A groove 53B may be formed in a side surface of the first portion 53a adjacent to the first extension 53-1 so as to allow the first extension 53-1 to be easily bent, and a second groove 53A may be formed in another side surface of the first portion 53a adjacent to the second extension 53-2 so as to allow the second extension 53-2 to be easily bent.

The upper surface of the first portion 53a of each of the first of first to fourth of first terminals 61-1 to 61-4 may be exposed from the upper surface of the holder 80. The third portion 53c of each of the first of first to fourth of first terminals 61-1 to 61-4 and the first and second bent portions 53d and 53e may be exposed from the first or second side surface 80A or 80B of the holder 80, and the second portion 53b of each of the first of first to fourth of first terminals 61-1 to 61-4 may project from the first side surface 80A or the second side surface 80B of the holder 80.

Figure 8B:
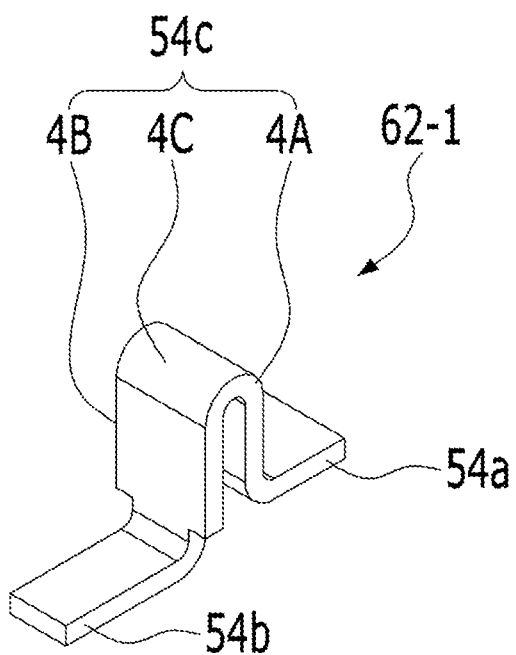
FIG. 8B is a perspective view of a first of second terminal.

FIG. 8B is a perspective view of the first of second terminal 62-1. The description of the first of second terminal 62-1 shown in FIG. 8B may be applied to each of the sixth to eighth terminals 62-2 to 62-4 with or without modification.

Referring to FIG. 8B, the first of second terminal 62-1 may include a first portion (or a first coupler) 54a, which is exposed from the lower portion of the holder 80, a second portion (or a second coupler) 54b, which projects toward the side surface 80A or 80B of the holder 80, and a third portion 54c, which connects the first portion 54a to the second portion 54b.

For example, each of the first of second to fourth of second terminals 62-1 to 62-4 may include the first portion 54a, which is connected to a corresponding one of the first to fourth connecting terminals 71 to 74, the second portion 53b, which is connected to a corresponding one of the fifth to eighth electric connection portions 92-1 to 92-4 of the electric connection member 90, and the third portion 53c, which connects the first portion 53a to the second portion 53b.

The first portion 54a may be disposed under the upper surface 8a of the holder 80.

The second portion 54b may project from the side surface 80A or 80B of the holder 80.

At least a portion of the third portion 53c may be disposed at the upper surface 8a and the side surface 80A or 80B of the holder 80.

The holder 80 may have therein holes, through which at least portions of the first of second to fourth of second terminals 62-1 to 62-4 are exposed from the lower portion of the holder 80.

For example, the holder 80 may have a first hole 25A, which is formed between the bore 81A and the first side surface 80A of the holder 80, and a second hole 25B, which is formed between the bore 81A and the second side surface 80B of the holder 80.

Although each of the first and second holes 25A and 25B may be formed through the holder 80 in the optical-axis direction, the disclosure is not limited thereto. In another embodiment, the holder may have a groove, through which the lower surface of the first portion 54a of each of the first of second to fourth of second terminals 62-1 to 62-4 is exposed.

For example, although the first portion 54a of each of the first of second to fourth of second terminals 62-1 to 62-4 may be positioned lower than the first portion 53a of each of the first of first to fourth of first terminals 61-1 to 61-4, the disclosure is not limited thereto. In another embodiment, the former may be disposed at the same height as the latter.

The third portion 54c may include a first region 4A, which is connected to the first portion 54a and extends upwards therefrom, a second region 4B, which is connected to the second portion 54b and extends upwards therefrom, and a third region 4C, which connects the first region 4A to the second region 4B.

For example, the first region 4A may be disposed in the hole 25A or 25B, the second region 4B may be disposed on the side surface 80A or 80B of the holder 80, and the third region 4C may be disposed on the upper surface 8a of the holder 80 adjacent to the side surface 80A or 80B of the holder 80.

For example, although each of the first region 4A and the second region 4B may have a linear shape and the third region 4C may have a curved or bent shape, which is convex upwards, for example, an inverted "U" shape, the disclosure is not limited thereto. In another embodiment, the third region may have a linear shape.

For example, the portion between the first region 4A and the first portion 54a may have a bent shape, and the portion between the second region 4B and the second portion 54b may have a bent shape.

For example, at least a portion of the first portion 54a of each of the first of second to fourth of second terminals 62-1 to 62-4 may overlap a corresponding one of the first to fourth connecting terminals 71 to 74 in the optical-axis direction.

For example, the fifth and sixth terminals 62-1 and 62-2 may be disposed on the first side surface 80A, and may be disposed between the first of first terminal 61-1 and the second of first terminal 61-2.

For example, the seventh and eighth terminals 62-3 and 62-4 may be disposed on the second side surface 80B of the holder 80, and may be disposed between the third of first terminal 61-3 and the fourth of first terminal 61-4.

The connector 70 may be disposed under the holder 80. For example, the connector 70 may be disposed on the lower surface 8b of the holder 80. The connector 70 may connect the lower electrode 50B to the second terminal portion (or the second terminal).

The connector 70 may include the first to fourth connecting terminals 71 to 74, which are spaced apart from one another. Here, the connector may alternatively be referred to as a "connecting terminal", a "lower connecting terminal (or a second connecting terminal)", a "lower connecting circuit board" (or a "second connecting circuit board)", a "connecting frame", a "connecting electrode", or a "bridge".

The connector 70 may include the first to fourth connecting terminals 71 to 74, which are spaced apart from one another.

Figure 8C:
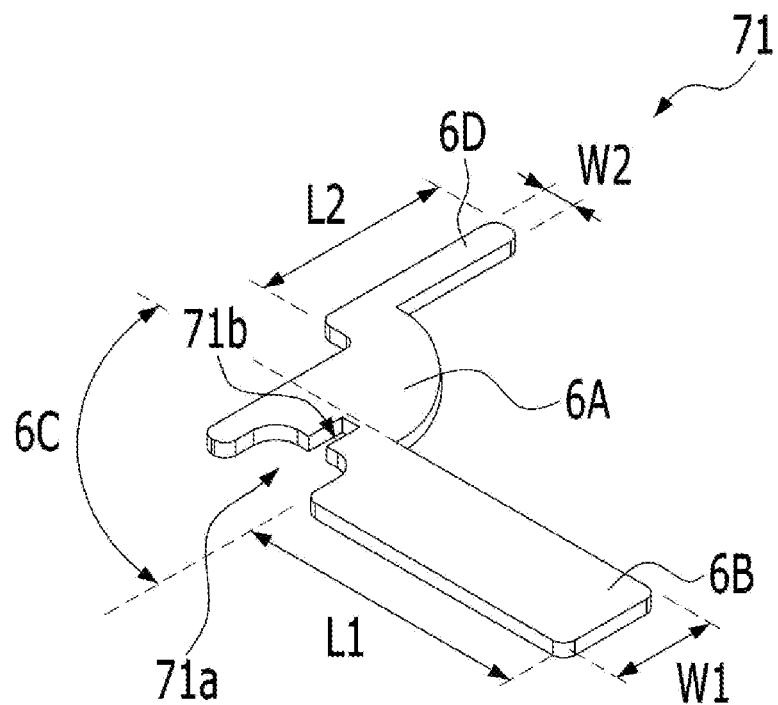
FIG. 8C is a perspective view of a first connecting terminal.

FIG. 8C is a perspective view of the first connecting terminal 71. The description of the first connecting terminal 71 shown in FIG. 8C may be applied to each of the second to fourth connecting terminals 72 to 74 with or without modification.

Referring to FIGS. 7B and 8C, the first connecting terminal 71 may include a first portion (or a first coupler) 6A, which is connected to the first lower electrode 50a of the liquid lens 50, and the second portion 6B, which is connected or coupled to the first of second terminal 62-1 of the terminal portion 60. Furthermore, the first connecting terminal 71 may further include a third portion 6C (the dotted portion in FIG. 8C), which connects the first portion 6A to the second portion 6B.

The second portion 6B and the third portion 6C of the first connecting terminal 71 may be disposed at a first side of the lower surface of the holder 80. For example, the first side of the lower surface of the holder 80 may be a region adjacent to the first side surface 80A of the holder 80 at which the terminals 61-1, 61-2, 62-1 and 62-2 of the terminal portion 60 are disposed.

The first portion 6A of the first connecting terminal 71 may be coupled to the first portion 54a of the first of second terminal 62-1 via a conductive adhesive.

For example, at least a portion of the first portion 6A of the first connecting terminal 71 may overlap the first lower electrode 50a in the optical-axis direction. For example, although the first lower electrode 50a may include a region that does not overlap the first portion 6A of the first connecting terminal 71, the disclosure is not limited thereto. In another embodiment, the entirety of the first lower electrode 50a may overlap the first portion 6A of the first connecting terminal 71.

Although the first portion 6A of the first connecting terminal 71 may have a sector shape in FIG. 8C, the disclosure is not limited thereto. The first portion 6A may have any of various shapes capable of being coupled to the first lower electrode 50a.

The first connecting terminal 71 may include a fourth portion (or an extension) 6D, which extends to the third side of the lower surface of the holder 80, which is adjacent to the first side of the lower surface of the holder 80, from the first portion 6A. For example, the third side of the lower surface of the holder 80 may be a region adjacent to the third side surface 80C of the holder 80.

For example, the fourth portion 6D may include at least one bent portion.

For example, the fourth portion 6D may include a first extension, which is connected to one end of the first portion 6A and extends to the second side of the lower surface of the holder 80, and a second extension, which is connected to one end of the first extension and extends toward the second side surface 80B from the first side surface 80A of the holder 80. For example, although the length of the second extension may be greater than the length of the first extension, the disclosure is not limited thereto.

For example, by means of a conductive adhesive, the first lower electrode 50a of the liquid lens 50 may be coupled to the first portion (or the first coupler) 6A of the first connecting terminal 71. For example, by means of a conductive adhesive, the first portion 54a of the fifth terminal 63-1 may be connected or coupled to the second portion 6B of the first connecting terminal 71. Here, the conductive adhesive may be disposed between the lower surface of the first portion 54a of the first of second terminal 62-1, which is exposed through the hole 25A or 25B, and the upper surface of the upper surface of the second portion 6B of the first connecting terminal 71 so as to couple the former to the latter.

For example, each of the second to fourth connecting terminals 72 to 74 of the connector 70 may include a first portion (or a first coupler) 6A, which is connected to a corresponding one of the second to fourth lower electrodes 50b to 50d of the liquid lens 50, a second portion 6B, which is connected or coupled to a corresponding one of the sixth to eighth terminals 62-2 to 62-4 of the terminal portion 60, and a third portion (or a connector) 6C, which connects the first portion 6A to the second portion 6B.

The second portion 6B and the third portion 6C of the second connecting terminal 72 may be spaced apart from the first connecting terminal 71, and may be disposed at the first side of the lower surface of the holder 80.

The second portion 6B and the third portion 6C of each of the third and fourth connecting terminals 73 and 74 may be disposed at the second side of the lower surface of the holder 80. The second side of the lower surface of the holder 80 may be a region adjacent to the second side surface 80B of the holder 80.

At least a portion of the first portion 6A of each of the second to fourth connecting terminals may overlap a corresponding one of the second to fourth lower electrodes 50b to 50d.

The third side of the lower surface of the holder 80 may have formed therein a groove 15a, in which at least a portion of the fourth portion 6D of each of the first to fourth connecting terminals 71 to 74 is disposed. Furthermore, the fourth side of the lower surface of the holder 80 may have formed therein a groove 15b, in which at least a portion of the fourth portion 6D of each of the second and third connecting terminals 72 and 73 is disposed.

The fourth portions 6D of the first to fourth connecting terminals 71 to 74 may serve to increase the coupling force between the holder 80 and the first to fourth connecting terminals 71 to 74 and to inhibit rotation of the first to fourth connecting terminals 71. For example, an adhesive may be disposed between the fourth portion 6D and the holder 80 so as to couple the fourth portion 6D to the holder 80.

For example, the fourth portion 6D of each of the second to fourth connecting terminals 72 to 74 may include at least one bent portion, and the description of the bent portion of the first connecting terminal 71 may be applied to the at least one bent portion, with or without modification.

For example, the fourth portion 6D of the second connecting terminal 72 may include a first extension, which is connected to one end of the first portion 6A and extends toward the fourth side of the lower surface of the holder 80, and a second extension, which is connected to one end of the first extension and extends toward the second side surface 80B from the first side surface 80A of the holder 80.

For example, the fourth portion 6D of the third connecting terminal 73 may include a first extension, which is connected to one end of the first portion 6A and extends toward the fourth side of the lower surface of the holder 80, and a second extension, which is connected to one end of the first extension and extends toward the second side surface 80B from the first side surface 80A of the holder 80.

For example, the fourth portion 6D of the fourth connecting terminal 74 may include a first extension, which is connected to one end of the first portion 6A and extends toward the third side of the lower surface of the holder 80, and a second extension, which is connected to one end of the first extension and extends toward the second side surface 80B from the first side surface 80A of the holder 80.

For example, each of the second to fourth lower electrodes 50b to 50d of the liquid lens 50 may be coupled to the first portion 6A of a corresponding one of the second to fourth connecting terminals 72 via a conductive adhesive.

Furthermore, the first portion 54a of each of the sixth to eighth terminals 62-2 to 62-4 may be connected or coupled to the second portion 6B of a corresponding one of the second to fourth connecting terminals 72 to 74 via a conductive adhesive. Here, the conductive adhesive may be disposed between the lower surfaces of the first portions 54a of the sixth to eighth terminals 62-2 to 62-4, which are exposed through the holes 25A and 25B in the holder 80, and the upper surfaces of the second portions 6B of the second to fourth connecting terminals 72 to 74 so as to couple the former to the latter.

The holder 80 may have formed therein an adhesive injection groove 81, into which an adhesive is injected. The adhesive injection groove 81 may be formed in a region adjacent to each of the corners of the lower surface of the holder 80.

For example, the adhesive injection groove 81 may be formed in at least one of the first side and the second side of the lower surface of the holder 80. Each of the first to fourth connecting terminals 71 to 74 may have formed therein one or more grooves 71a and 71b, which are configured to avoid spatial interference with the adhesive injection groove 81 and to expose the adhesive injection groove.

For example, the grooves 71a and 71b may be formed in the third portion 6C of each of the first to fourth connecting terminals 71 to 74.

For example, each of the first to fourth connecting terminals 71 to 74 may have formed therein a first groove 71a, which is depressed from a side surface of the third portion 6C, and a second groove 71b, formed at the first groove 71a so as to be connected thereto.

Although the length L1 of the second portion 6B of the first connecting terminal 71 may be greater than the length L2 of the fourth portion 6D (L1>L2), the disclosure is not limited thereto. In another embodiment, the former may be less than or equal to the latter (L1≤L2).

Although the width W1 of the second portion 6B of the first connecting terminal 71 may be greater than the width W2 of the fourth portion 6D (W1>W2), the disclosure is not limited thereto. In another embodiment, the former may be less than or equal to the latter (W1≤W2).

The second portion 6B of each of the first to fourth connecting terminals 71 to 74 may overlap the first portion 54a of a corresponding one of the first of second to fourth of second terminals 62-1 to 62-4 in the optical-axis direction.

For example, the third portion 6C and the fourth portion 6D of each of the first to fourth connecting terminals 71 to 74 may not overlap a corresponding one of the first to fourth lower electrodes 50a to 50d in the optical-axis direction.

The second lens unit 112 may be disposed over the first lens unit 130, and may be a region into which light is introduced from outside the lens assembly 120. In other words, the second lens unit 112 may be disposed over the first lens unit 130 in the lens barrel 110.

The second lens unit 112 may be embodied as a single lens or two or more lenses. For example, the two or more lenses of the second lens unit 112 may be aligned with each other along the central axis so as to form an optical system.

Here, the central axis may mean the optical axis OA of the optical system, which is constituted by at least one of the second lens unit 112, the first lens unit 130 and the third lens unit 113 included in the camera module 100, or may mean an axis parallel to the optical axis OA.

The optical axis OA may correspond to the central axis of the effective image area (or the active area) of the image sensor 160. In other words, the second lens unit 112, the first lens unit 130, the third lens unit 113, and the image sensor 160 may be aligned along the optical axis OA through active alignment (AA) so as to overlap one another.

Here, the active alignment may be an operation of aligning the optical axes of the first to third lens unit 111, 112 and 130 and controlling the axial relationship or distance between the image sensor 160 and the lens units 111, 112 and 130 in order to obtain a better image.

Although the outside diameters of the lenses included in the second lens unit 112 may sequentially increase downwards (for example, in the −z-axis direction), the disclosure is not limited thereto.

An exposed lens (not shown) may be provided in front of or on the front surface of the second lens unit 112. Here, the exposed lens may project outwards from the lens barrel 110 so as to be exposed. In order to protect the surface of the exposed lens, a cover glass or a coating layer may be provided in front of the exposed lens.

The third lens unit 113 may be disposed under the first lens unit 130 in the lens barrel 110. The third lens unit 113 may be spaced apart from the second lens unit 112 in the optical-axis direction (for example, in the z-axis direction).

Light introduced into the second lens unit 112 from outside the camera module 100 may be introduced into the third lens unit 113 through the first lens unit 130. The third lens unit 113 may be embodied as a single lens or as two or more lenses aligned with each other along the central axis so as to form an optical system.

Unlike the first lens unit 130, each of the second lens unit 112 and the third lens unit 113 may be embodied as a solid lens made of glass or plastic. However, the disclosure is not limited with regard to the specific material of the second lens unit 112 or the third lens unit 113.

Figure 9:
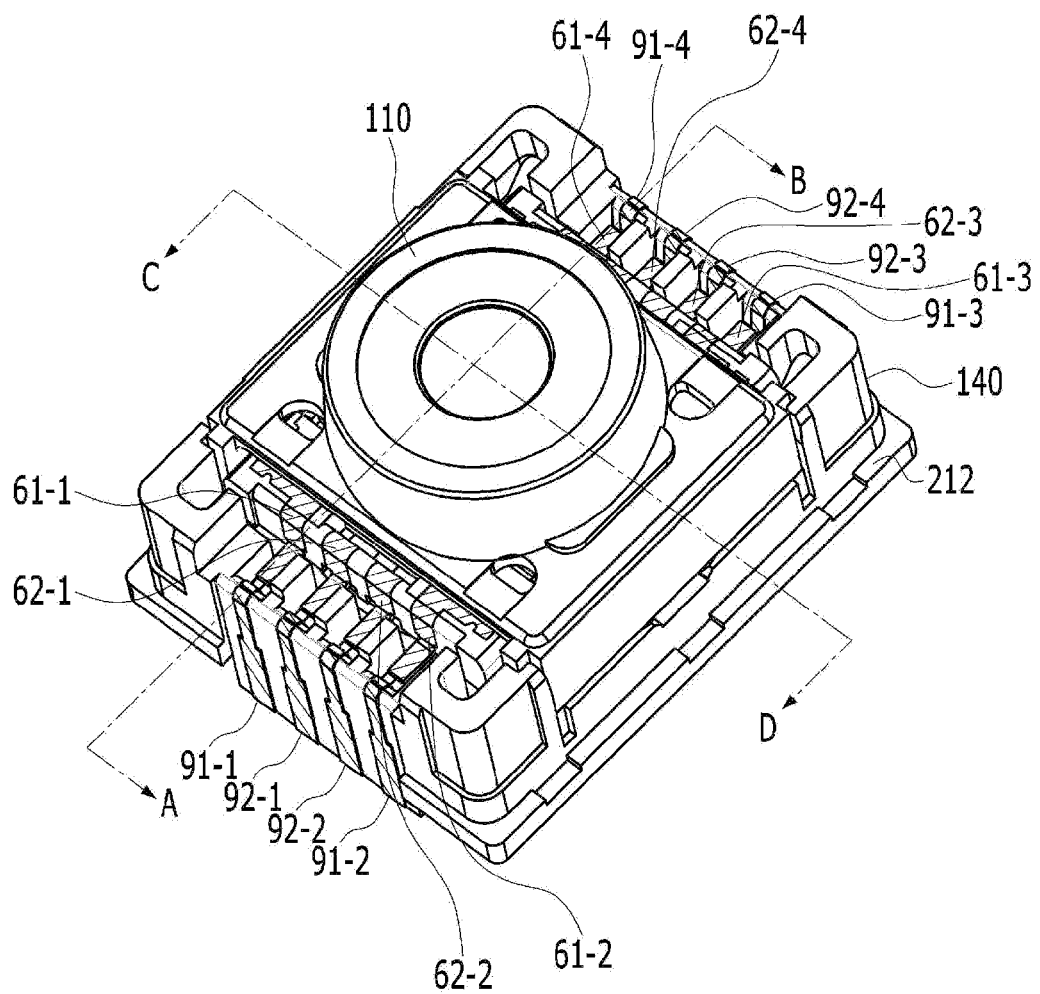
FIG. 9 is a perspective view of the first lens unit, an electric connection member, and a lens holder, which are received in a lens barrel.
Figure 10:
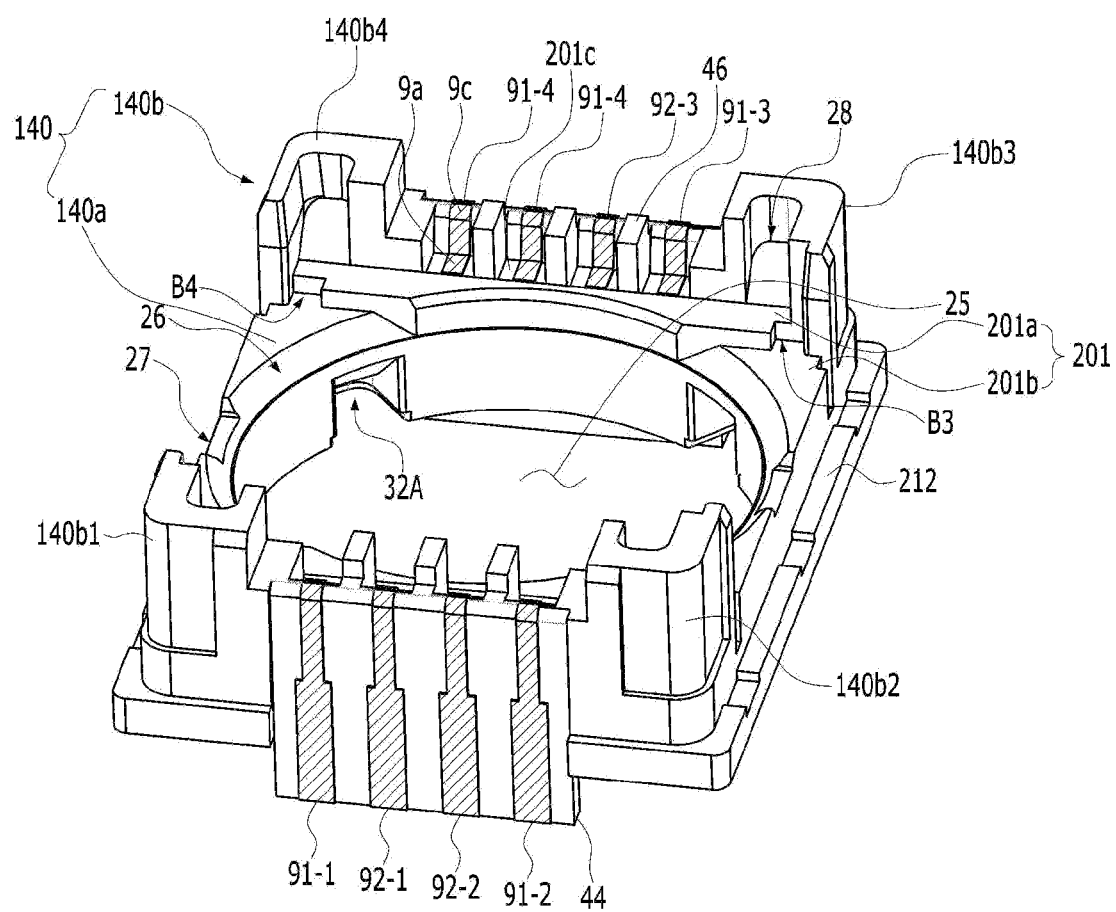
FIG. 10 is a perspective view of the electric connection member and the lens holder.
Figure 11A:
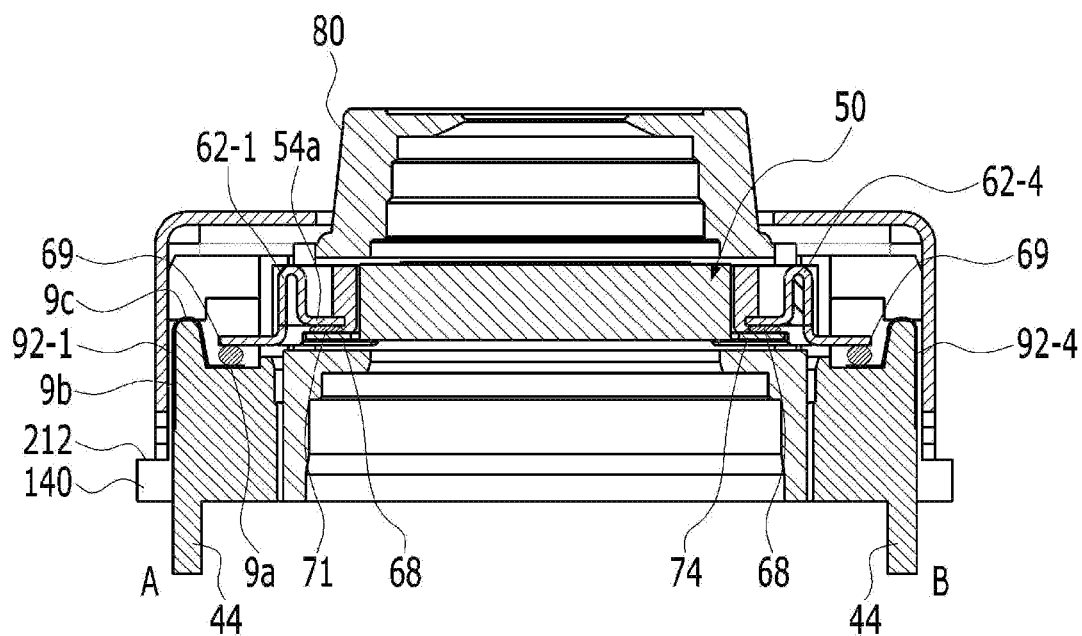
FIG. 11A is a cross-sectional view of a first lens unit and the lens holder taken along line A-B in FIG. 9.
Figure 11B:
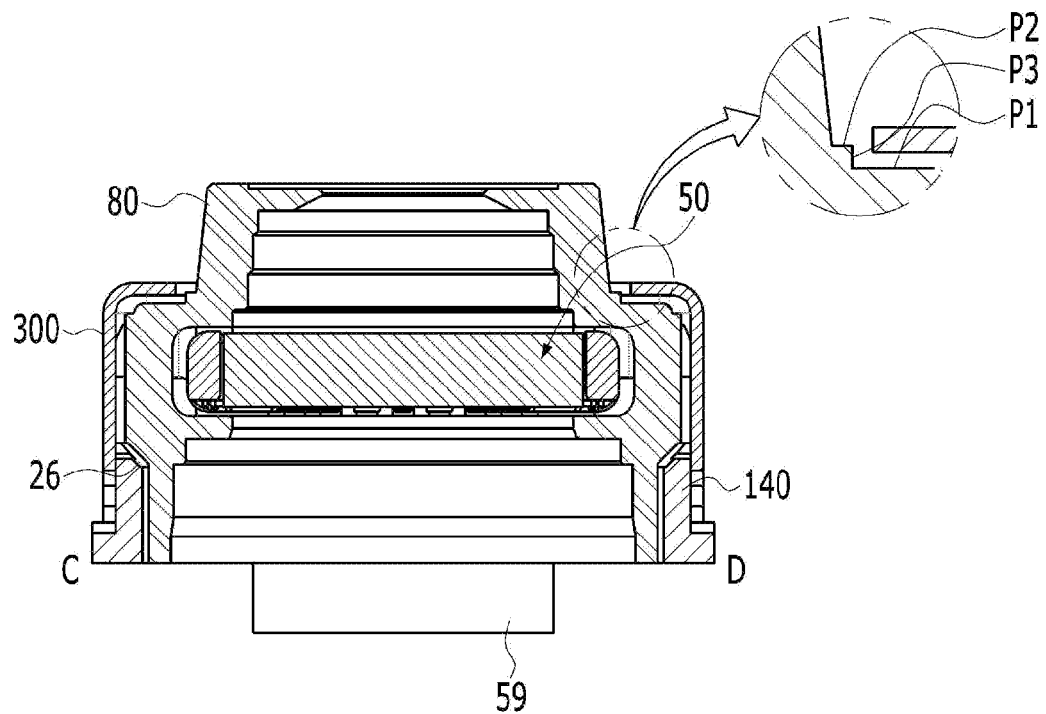
FIG. 11B is a cross-sectional view of the first lens unit and the lens holder taken along line C-D in FIG. 9.
Figure 12:
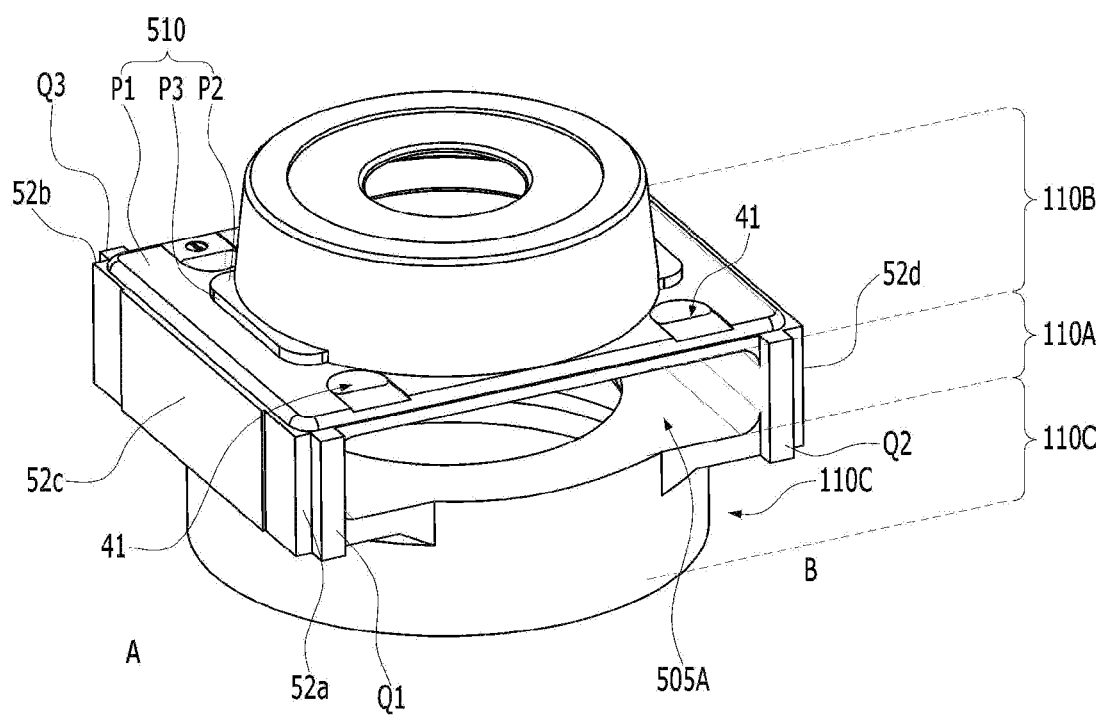
FIG. 12 is a front perspective of the lens barrel.
Figure 13:
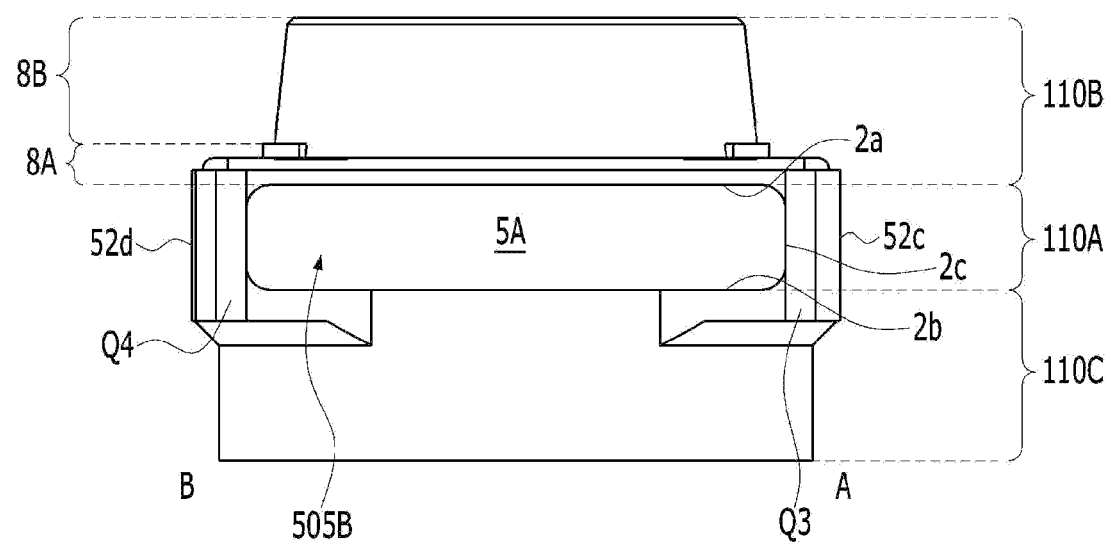
FIG. 13 is a rear view of the lens barrel shown in FIG. 12.
Figure 14:
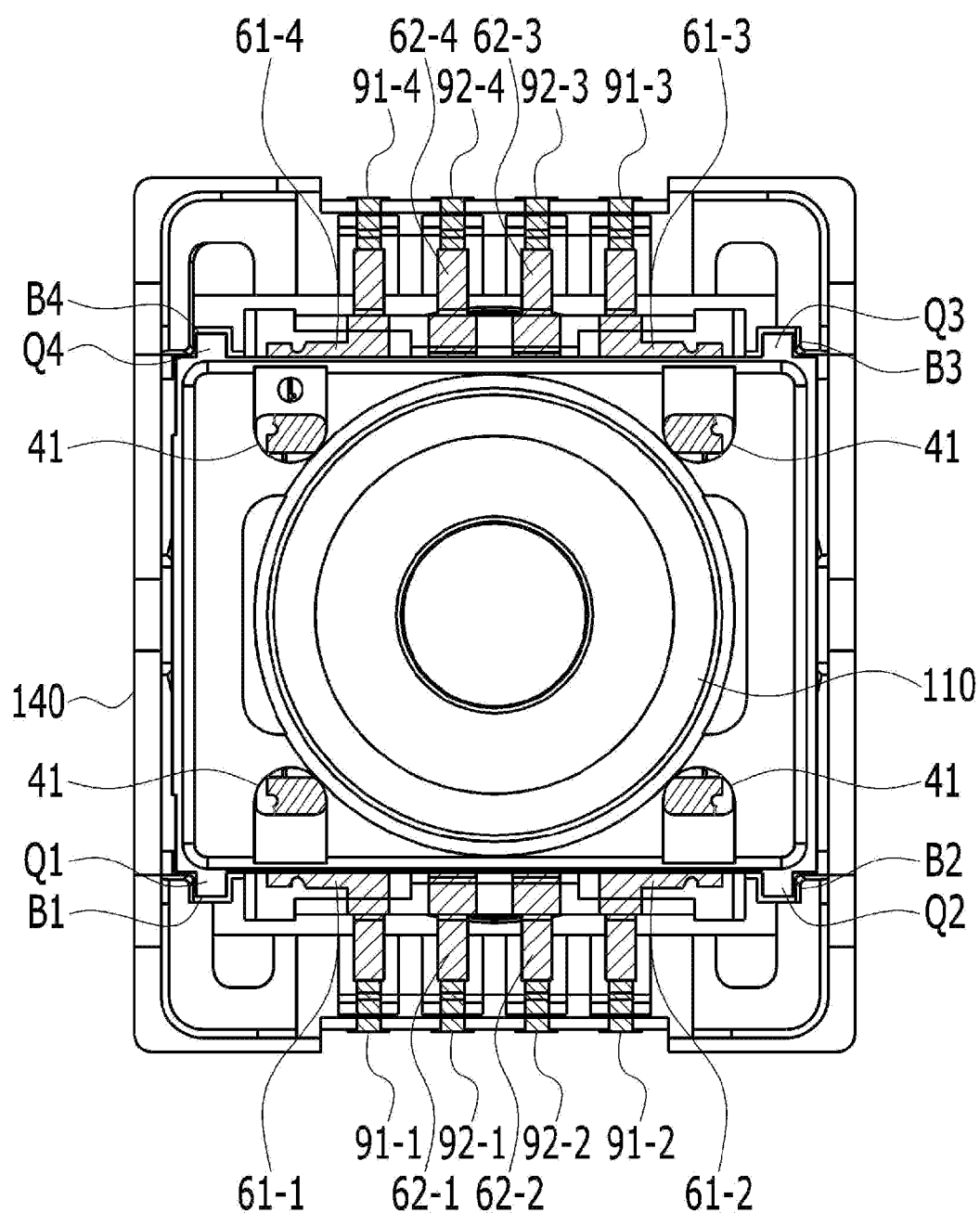
FIG. 14 is a plan view of the lens barrel, the first lens unit, the electric connection member, and the lens holder.

FIG. 9 is a perspective view of the first lens unit 130, the electric connection member 90, and the lens holder 140, which are received in the lens barrel 110. FIG. 10 is a perspective view of the electric connection member 90 and the lens holder 140. FIG. 11A is a cross-sectional view of the first lens unit 130 and the lens holder 140 taken along line A-B in FIG. 9. FIG. 11B is a cross-sectional view of the first lens unit and the lens holder 140 taken along line C-D in FIG. 9. FIG. 12 is a front perspective view of the lens barrel 110. FIG. 13 is a rear view of the lens barrel 110 shown in FIG. 12. FIG. 14 is a plan view of the lens barrel 110, the first lens unit 130, the electric connection member 90, and the lens holder 140.

Referring to FIGS. 9 to 14, the lens holder 140 may be disposed under the holder 80, and may receive or support the lens barrel 110. For example, the lower surface of the holder 80 of the first lens unit 130, which is disposed or seated on the first lens barrel 110A of the lens barrel 110, may be disposed higher than the upper surface of the lens holder 140.

The lens holder 140 may include a body 140a, and at least one projection 140b, which projects from the upper surface 201 of the body 140a in the optical-axis direction.

The body 140a may have therein a cavity or bore 25, in which at least a portion of the holder 80 is disposed or received.

The cavity 25 may have a shape that is identical to or coincides with the shape of at least a portion of the lens barrel 110. For example, although the cavity 25 may have a circular shape, an elliptical shape or a polygonal shape, the disclosure is not limited thereto. For example, the cavity 25 may be a hole formed through the lens holder 140 in the optical-axis direction.

The projection 140b may include a plurality of projections.

For example, the lens holder 140 may include four projections 140b1 to 140b4, which are formed at the four corners of the upper surface of the body 140a.

In the embodiment, the lens holder 140 may include a lower surface that faces the upper surface of the sensor base 180. The first adhesive 40 may be applied to the upper surface of the sensor base 180 and the lower surface of the lens holder 140.

The lens holder 140 may include a partition wall 46 disposed on the body 140a.

The partition wall 46 may be disposed in regions of the body 140a between the electric connection portions 91-1 to 91-4 and 92-1 to 92-4.

For example, the partition wall 46 may include a plurality of partition walls, and each of the plurality of partition walls 46 may be disposed in a corresponding one of the regions of the body 140a between the electric connection portions 91-1 to 91-4 and 92-1 to 92-4.

For example, the partition wall 46 may be disposed between two adjacent electric connection portions, which are disposed on the body 140a.

The plurality of partition walls 46 may partition the space between the lens holder 140 and the first lens unit 130 into a plurality of spaces, in respective ones of which the terminals 61-1 to 61-4 and 62-1 to 62-4 of the terminal portion 60 of the first lens unit 130 are respectively coupled to the electric connection portions 91-1 to 91-4 and 92-1 to 92-4 corresponding to the terminals 61-1 to 61-4 and 62-1 to 62-4 via a conductive adhesive.

The upper surface 201 of the lens holder 140 may include a first surface 201a and a second surface 201b, which has a height difference with respect to the first surface 201a.

For example, the height of the second surface 201b may be lower than the height of the first surface 201a. For example, the distance between the lower surface of the lens holder 140 and the second surface 201b may be less than the distance between the lower surface of the lens holder 140 and the first surface 201a.

For example, the first surface 201a may be disposed or positioned at the first to fourth corners of the upper surface of the body 140a, a first area between the first corner and the second corner of the upper surface of the body 140a, and a second area between the third corner and the fourth corner of the upper surface of the body 140a.

For example, the second surface 201b may be disposed or positioned in a third area between the first corner and fourth corner of the upper surface of the body 140a and the fourth area between the second corner and the third corner of the upper surface of the body 140a.

The lens holder 140 may have therein a groove 27 formed in the second surface 201b.

The groove 27 may be depressed from the second surface 201b. For example, the groove 27 may be formed in each of the third region and the fourth region of the second surface 201b of the body 140a.

The lens holder 140 may have formed therein a groove 28, which is depressed from the upper surface of the projection 140b. For example, the groove 28 may be formed in each of the first to fourth projections 140b1 to 140b4. An adhesive may be disposed in the groove 28 so as to couple the lens holder 140 to the lens barrel 110.

The lens holder 140 may have grooves (or coupling grooves) B1 to B4, into which protrusions (or coupling protrusions) Q1 to Q4 of the lens barrel 110 are coupled.

For example, the protrusions Q1 to Q4 of the lens barrel 110 may project in a direction which is perpendicular both to the optical axis and to the outer surface of the lens barrel 110.

For example, the grooves B1 to B4 in the lens holder 140 may be depressed from the first surface 201a of the lens holder 140. For example, the grooves B1 to B4 may be configured so as to be depressed from the first surface 201a to the second surface 201b of the lens holder 140.

The grooves B1 to B4 in the lens holder 140 may have openings that face the protrusions Q1 to Q4. For example, the lens barrel 110 may include four protrusions Q1 to Q4, and the lens holder 140 may have four grooves B1 to B4, which correspond to or face the four protrusions Q1 to Q4. However, the number of protrusions and the number of grooves are not limited thereto, and may be respectively one or more.

The lens holder 140 may include a step 212 or a shoulder 212.

The step 212 may be formed on the outer surface of the lens holder 140.

The step 212 may be formed at the lower end of the outer surface of the lens holder 140.

The side plate 302 of the cover 300 may be disposed on the step 212. For example, although the step 212 and the side plate 302 of the cover 300 may be coupled to each other, the disclosure is not limited thereto. In another embodiment, the step 212 may be spaced apart from the side plate 302 of the cover 300.

The electric connection member 90 may be disposed at the lens holder 140, and may be conductively connected to the terminal portion 60 of the first lens unit 130. Furthermore, the electric connection member 90 may be conductively connected to the terminals 195 of the circuit board 190.

The electric connection member 90 may be spaced apart from the cover 300. The electric connection member 90 may be formed as a single integral unit.

The electric connection member 90 may include the plurality of electric connection portions 91-1 to 91-4 and 92-1 to 92-4. Although eight electric connection portions are illustrated in FIG. 10, the number of electric connection portions is not limited thereto. The electric connection member 90 may include one or more electric connection portions. The electric connection portion may alternatively be referred to as a "terminal", an "electrode", a "bonding portion", or a "lead frame".

Referring to FIG. 11A, each of the terminals 61-1 to 61-4 and 62-1 to 62-4 of the terminal portion 60 may be conductively connected or coupled to a corresponding one of the electric connection portions 91-1 to 91-4 and 92-1 to 92-4 via a conductive adhesive 69.

Each of the electric connection portions 91-1 to 91-4 and 92-1 to 92-4 may include the first coupler 9a, which is coupled to the upper electrode 60 via the conductive adhesive 69. The first coupler 9a may be in contact with the conductive adhesive 69.

The conductive adhesive 69 may include at least one of solder and a conductive adhesive. For example, the conductive adhesive 69 may include Ag epoxy. The conductive adhesive 69 may be disposed between the plurality of partition walls 46 of the lens holder 140.

The upper surface of the lens holder 140 may include a third surface 201c on which the first coupler 9a is disposed. For example, the upper surface of the lens holder 140 may have a height difference with respect to the third surface 201c. For example, although the third surface 201c may be lower than the first surface 201a, the disclosure is not limited thereto. In another embodiment, the third surface 201c may be the same surface as the first surface or the second surface.

Although the upper surface of the first coupler 9a may be flush with the third surface 201c of the upper surface of the lens holder 140, the disclosure is not limited thereto. At least a portion of the upper surface of the first coupler 9a may be exposed from the upper surface (for example, the third surface 201c) of the lens holder 140.

The first coupler 9a of each of the electric connection portions may overlap a corresponding second coupler 53b or 54b of the terminal portion 60 of the first lens unit 130 in a vertical direction.

Each of the electric connection portions 91-1 to 91-4 and 92-1 to 92-4 may further include a second coupler 9b, which is connected or coupled to a corresponding one of the terminals of the circuit board 190.

For example, a portion of the second coupler 9b may be exposed from the outer surface of the lens holder 140. For example, although the second coupler 9b may project downwards from the lower surface of the lens holder 140, the disclosure is not limited thereto. In another embodiment, the second coupler 9b may not project downwards from the lower surface of the lens holder 140.

For example, the lens holder 140 may include a terminal surface or a terminal formation region 44 in which the electric connection portions are disposed or formed. The terminal surface or the terminal formation region 44 may project from the lower surface of the lens holder 140.

Although, in an example, the second coupler 9b may have a linear shape, the disclosure is not limited thereto. Although the second coupler 9b may include a bent portion in another embodiment, the disclosure is not limited thereto. In a further embodiment, the second coupler 9b may include at least one of the linear portion and the bent portion.

Each of the electric connection portions 91-1 to 91-4 and 92-1 to 92-4 may further include a connector 9c connecting the first coupler 9a to the second coupler 9b.

For example, although the connector 9c may have a bent shape and may be positioned in the lens holder 140, the disclosure is not limited thereto. In another embodiment, the connector 9c may be exposed to the outside of the lens holder 140.

Although the conductive adhesive 69 is explained as a separate component independent of the electric connection member 90, the conductive adhesive 69 may be a single component integrally formed with the conductive member 90.

In the embodiment, the lower surface of the first lens unit 130 may be disposed on the upper surface 201 of the lens holder 140. Here, the conductive adhesive 69, which connects the terminal portion 60 of the first lens unit 130 to the electric connection member 90, may be disposed on the upper surface 201 of the lens holder 140.

In the embodiment, a portion (for example, 53b or 54b) of the terminal portion 60 of the first lens unit 130 may be embedded in the conductive adhesive 69. As a result, the upper end 60 of the first lens unit 130 may be conductively connected even without applying external pressure to the terminal portion 60.

According to the embodiment, it is possible to ensure a stable resistance by increasing the contact area of the conductive adhesive 69 between the terminal portion 60 of the first lens unit 130 and the electric connection member 90.

Each of the electric connection portions 91-1 to 91-4 and 92-1 to 92-4 of the electric connection member 90 may include a conductive layer formed on the surface of the lens holder 140. Here, the conductive layer may be formed on the surface of the lens holder 140 using a molded interconnection device (MID) technology.

The conductive layer may extend along the upper surface 201 and the outer surface of the lens holder 140, and may be connected at one end thereof to the terminal 195 of the circuit board 190 and at the other end thereof to the terminal portion 60 of the first lens unit 130.

In a modification, the conductive layer of each of the electric connection portions 91-1 to 91-4 and 92-1 to 92-4 of the electric connection member 90 may be formed at the lens holder 140 through insert injection molding.

In a modification, the electric connection portions 91-1 to 91-4 and 92-1 to 92-4 of the electric connection member 90 may be configured such that separate terminals are bonded to the lens holder 140.

For example, each of the electric connection portions 91-1 to 91-4 and 92-1 to 92-4 may be configured such that at least a portion thereof has a width different from the width of another portion thereof.

The lens holder 140 may have a groove 32A, which serves as a bonding tank in which an adhesive, for example, glue is applied.

For example, the groove 32A may be formed in the lower surface of the lens holder 140. For example, the groove 32A may be formed in the inner circumferential surface or the inner surface of the lens holder 140.

The groove 32A may extend from the lower surface of the lens holder 140, and may be spaced apart from the upper surface of the lens holder 140. An adhesive may be disposed into the groove 32A so as to couple the lens holder 140 to the lens module 110.

The cover 300 may cover the lens holder 140, and may receive therein the lens holder 140.

The cover 300 may define the appearance of the camera module 100. The cover 300 may be configured to have the form of a polyhedron, for example, a hexahedron, which is open at the lower surface thereof.

The cover 300 may be a nonmagnetic body. The cover 300 may be made of metal.

For example, the cover 300 may be made of a metal plate.

The cover 300 may be connected to the ground of the circuit board 190. Accordingly, the cover 300 may be grounded. The cover 300 may block electromagnetic interference (EMI). In this case, the cover 300 may be referred to as an "EMI shield can".

The cover 300 may include an upper plate and a side plate 302 extending from the upper plate 301. The upper plate 301 of the cover 300 may have therein a bore (or hole) 303, through which at least a portion of the lens barrel 110 is exposed.

The side plate 302 of the cover 300 may have therein an opening, through which at least a portion of the electric connection member 90 is exposed. For example, the opening in the side plate 302 of the cover 300 may expose the coupler 9b of at least one of the electric connection portions 91-1 to 91-4 and 92-1 to 92-4.

Referring to FIGS. 12 and 13, the lens barrel 110 may include the first barrel portion 110A, in which the liquid lens unit 130 is disposed or received, the second barrel portion 110B, in which the second lens unit 112 is disposed or received, and the third barrel portion 110C, in which the third lens unit 113 is disposed or received.

The second barrel portion 110B may be disposed on the first barrel portion 110A, and the third barrel portion 110C may be disposed beneath the first barrel portion 110A.

The first barrel portion 110A may include the body and a reception space 5A1 formed in the body. The first lens unit 130 may be disposed in the reception space in the body of the first barrel portion 110A. The reception space 5A1 may have a shape suitable for receiving the first lens unit 130. Here, the "reception space" may alternatively be referred to as a "space".

For example, the first barrel portion 110A may include an internal upper surface 2a, an internal lower surface 2b, and an internal side surface 2c connecting the internal upper surface 2a to the internal lower surface 2b, in order to define the reception space 5A1.

The body of the first barrel portion 110A may include a first side surface (or a first outer surface) 52a and a second side surface (or a second outer surface) 52b, which are positioned opposite each other, and a third side surface (or a third outer surface) 52c and a fourth side surface (or a fourth outer surface) 52d, which connect the first side surface 52a to the second side surface 52b and are positioned opposite each other. For example, the reception space 5A1 in the first barrel portion 110A may be formed inside the first to fourth side surfaces 52a to 52d of the body of the first barrel portion 110A.

One or more of the first side surface 52a and the second side surface 52b of the first barrel portion 110A may be provided with one or more openings 505A and 505B, through which the first lens unit 130 is fitted or assembled.

For example, as illustrated in FIGS. 12 and 13, the first barrel portion 110A may have therein the first opening 505A, which is formed in the first side surface 52a, and the second opening 505B, which is formed in the second side surface 52b.

By virtue of the first and second openings 505A and 505B, the reception space 5A1 in the first barrel portion 110A may be open toward the outside of the body of the first barrel portion 110A.

Referring to FIG. 11A, one end of the first lens unit 111 may project outwards beyond the first opening 505A in the first barrel portion 110A, and the other end of the first lens unit 111 may project outwards beyond the second opening 505B in the first barrel portion 110A.

The second barrel portion 110B may project from the upper portion of the body of the first barrel portion 110A. For example, the second barrel portion 110B may project from the upper portion of the first barrel portion 110A in the optical-axis direction or upwards.

For example, the second barrel portion 110B may include a first body 8A and a second body 8B disposed on the first body 8A.

The upper surface of the first body 8A may include a stepped portion 510, which includes a first surface P1, a second surface P2, which has a height difference in the optical-axis direction with respect to the first surface P1, and a third surface P3, which connects the first surface P1 to the second surface P2.

The second surface P2 of the upper surface of the first body 8A may abut on the second body 8B, and the first surface P1 of the upper surface of the first body 8A may abut on the upper portion or the upper end of the side surface of the first body 8A.

Referring to FIG. 12, the stepped portion 510 of the second barrel portion 110B may include a first stepped portion, which is disposed at one side of the second body 8B of the second barrel portion 110B, and a second stepped portion, which is disposed at the other side of the second body 8B of the second barrel portion 110B.

At least a portion of the second barrel portion 110B may be exposed through the bore 303 in the cover 300. For example, the second body 8B of the second barrel portion 110B may be exposed through the bore 303 in the cover 300. For example, the second body 8B of the second barrel portion 110B may project outwards from the cover 300 through the bore 303 in the cover 300.

For example, the second surface P2 of the first body 8A of the second barrel portion 110B may be exposed through the bore 303 in the cover 300. For example, a portion of the first surface P1 adjacent to the third surface P3 of the first body 8A of the second barrel portion 110B may be exposed through the bore 303 in the cover 300.

The second surface P2 of the first body 8A of the second barrel portion 110B may be positioned in the cover 300. For example, the second surface P2 of the first body 8A of the second barrel portion 110B may be positioned lower than the upper surface 301 of the cover 300.

The diameter of the bore 303 in the cover 300 may be greater than the diameter of the outer circumference of the second body 8B.

The inner surface of at least a portion of the upper plate 301 of the cover 300 may face or overlap the first surface P1 of the second barrel portion 110B of the lens barrel 110 in the optical-axis direction.

For example, the inner surface of a portion of the upper plate 301 of the cover 300 adjacent to the bore 303 may face or overlap the first surface P1 of the second barrel portion 110B in the optical-axis direction.

The upper plate 301 of the cover 300 may not face or overlap the second surface P2 of the second barrel portion 110B in the optical-axis direction.

For example, the inner surface of the upper plate 301 of the cover 300 may be positioned higher than the first surface P1 of the second barrel portion 110B. For example, the inner surface of the upper plate 301 of the cover 300 may be positioned lower than the second surface P2 of the second barrel portion 110B. In another embodiment, the inner surface of the upper plate 301 of the cover 300 may be positioned at the same level as the second surface P2 of the second barrel portion 110B. Accordingly, it is possible to avoid spatial interference between the upper plate 301 of the cover 300 and the second surface P2 of the second barrel portion 110B, and it is possible to inhibit an increase in the length (or the height) of the camera module 100 in the optical-axis direction.

In other words, it is possible to avoid spatial interference between the stepped portion 510 and the cover 300 by virtue of the bore 303 in the cover 300.

Although the appearance of the second body 8B of the second barrel portion 110B may have a cylindrical form, the disclosure is not limited thereto. The second body 8B may be embodied so as to have any of various forms.

The included angle between the outer surface of the second body 8B and the second surface of the first body 8A may be an obtuse angle. For example, the second body 8B may be configured to be inclined with respect to the second surface P2, and thus it is possible to inhibit deformation of an injection-molded product when the injection-molded product is taken out of or separated from a mold in an injection molding operation for formation of the lens barrel. In another embodiment, the included angle between the outer surface of the second body 8B and the second surface P2 of the first body 8A may be a right angle.

The second barrel portion 110B may have therein a reception space for receiving therein the second lens unit 112, and the third barrel portion 110C may have therein a reception space for receiving therein the third lens unit 113.

The inside of the first barrel portion 110A, the inside of the second barrel portion 110B, and the inside of the third barrel portion 110C may communicate with one another.

For example, the first barrel portion 110A may have therein a third opening, which connects the reception space in the first barrel portion 110A with the reception space 5A2 in the second barrel portion 110B. For example, the third opening in the first barrel portion 110A may be defined in the internal upper surface 2a of the first barrel portion 110A.

Furthermore, the first barrel portion 110A may have therein a fourth opening, which connects the reception space 5A1 in the first barrel portion 110A with the reception space in the third barrel portion 110C. For example, the fourth opening in the first barrel portion 110A may be defined in the internal lower surface 2b of the first barrel portion 110A.

For example, the crosswise length of the reception space 5A1 in the first barrel portion 110A may be greater than the crosswise length of each of the reception space in the second barrel portion 110B and the reception space in the third barrel portion 110C. Here, the crosswise direction may be a direction that is perpendicular to the optical axis and is directed toward the fourth side surface 52d from the third side surface 52c of the lens barrel 110. For example, although the reception space in the second barrel portion 110B may be smaller than the reception space in the third barrel portion 110C, the disclosure is not limited thereto. In another embodiment, the former may be equal to or larger than the latter.

For example, the crosswise length of the first lens unit 130 may be less than the crosswise length of the reception space 5A1 in the first barrel portion 110A. For example, although the orthogonal length of the first lens unit 130 may be greater than the orthogonal length of the reception space 5A1 of the first barrel portion 110A, the disclosure is not limited thereto. In another embodiment, the former may be equal to the latter. Here, the orthogonal direction may be a direction that is perpendicular both to the optical-axis direction and to the crosswise direction. In other words, the orthogonal direction may be a direction that is perpendicular to the optical-axis direction and is directed toward the second side surface 52b from the first side surface 52a of the lens barrel 110.

The second barrel portion 110B may have therein an opening, through which at least a portion of the second lens unit 112, for example, the uppermost lens, is exposed.

For example, the inner wall of the second barrel portion 110B, which defines the reception space in the second barrel portion 110B, may have at least one stepped structure. Although the peripheral region of the lens of the second lens unit 112 may be in surface contact with the stepped structure, the disclosure is not limited thereto.

The third barrel portion 110C may have an opening, through which at least a portion of the third lens unit 113, for example, the lowermost lens, is exposed. For example, the inner wall of the third barrel portion 110C, which defines the reception space in the third barrel portion 110C, may include at least one stepped structure. Although the peripheral region of the lens of the third lens unit 113 may be in surface contact with the stepped structure, the disclosure is not limited thereto.

The third surface P3 of the stepped portion 510 of the second barrel portion 110B may overlap the reception space 5A1 in the first barrel portion 110A in the optical-axis direction. Accordingly, it is possible to inhibit the strength of the second barrel portion 110B of the lens barrel 110 from being weakened due to the reception space 5A1 in the first barrel portion 110A and to reinforce the strength of the second barrel portion 110B.

For example, the second body 8B of the second barrel portion 110B and the second surface P2 of the first body 8A may overlap the reception space 5A1 in the first barrel portion 110A. Accordingly, it is possible to inhibit the strength of the second barrel portion 110B of the lens barrel 110 from being weakened due to the reception space 5A1 in the first barrel portion 110A and to reinforce the strength of the second barrel portion 110B.

The height to the second surface P2 of the first body 8A of the second barrel portion 110B from the first barrel portion 110A may be greater than the height to the first surface of the first body 8A of the second barrel portion 110B from the first barrel portion 110A.

Because the second barrel portion 110B includes the stepped portion 510, due to the stepped portion 510, the area of the outer circumferential surface of the second barrel portion 110B or the cross-sectional area of the second barrel portion 110B in the A-B direction may be increased.

Because the area of the outer circumferential surface of the second barrel portion 110B or the cross-sectional area of the second barrel portion 110B in the A-B direction is increased, the load that would otherwise be concentrated on the second barrel portion 110B due to the application of external force during an assembly operation is dispersed. Consequently, the embodiment is capable of suppressing deformation of the lens barrel 110 caused by external force during an assembly process. Here, the assembly process may include at least one of assembly of the lens barrel 110 with the lens assembly 120 and assembly of the lens barrel 110 with the lens holder 140.

Because the thickness of the first body 8A, which is located between the first barrel portion 110A and the second body 8B of the second barrel portion 110B, is increased due to the stepped portion 510, it is possible to increase the strength of the lens barrel 110 and thus to improve the structural reliability of the lens barrel 110.

The lens barrel 110 may include one or more protrusions Q1 to Q4, which project from at least one of the first side surface 52a and the second side surface 52b of the first barrel portion 110A.

The one or more protrusions Q1 to Q4 may project in a direction perpendicular to the optical axis.

For example, the first barrel portion 110A may include the first protrusion Q1, which projects from one end of the first side surface 52a of the first barrel portion 110A, the second protrusion Q2, which projects from the other end of the first side surface 52a of the first barrel portion 110A, the third protrusion Q3, which projects from one end of the second side surface 52b of the first barrel portion 110A, and the fourth protrusion Q4, which projects from the other end of the second side surface 52b of the first barrel portion 110A.

The first protrusion Q1 may be positioned at one side of the first opening 505A in the first barrel portion 110A, and the second protrusion Q2 may be positioned at the other side of the first opening 505A in the first barrel portion 110A. For example, the first opening 505A in the first barrel portion 110A may be positioned between the first protrusion Q1 and the second protrusion Q2.

The third protrusion Q3 may be positioned at one side of the second opening 505B in the first barrel portion 110A, and the fourth protrusion Q4 may be positioned at the other side of the second opening 505B in the first barrel portion 110A. For example, the second opening 505B in the first barrel portion 110A may be positioned between the third protrusion Q3 and the fourth protrusion Q4.

Each of the protrusions Q1 to Q4 of the lens barrel 110 may be disposed or fitted into a corresponding one of the grooves B1 to B4 in the lens holder 140.

The protrusions Q1 to Q4 of the lens barrel 110 are capable of inhibiting rotation of the lens barrel 110, or of inhibiting rotation of the lens barrel 110 beyond a predetermined angle, during assembly of the lens barrel 110 with the lens holder 140.

If the protrusions Q1 to Q4 of the lens barrel 110 and the grooves B1 to B4 in the lens holder 140 according to the embodiment are not provided, the lens barrel may be rotated and thus may project outwards from the lens holder 140 during assembly of the lens barrel with the lens holder, and there may be a collision between the cover and the lens barrel and deformation of the lens barrel and/or the cover during assembly of the cover with the lens holder. The embodiment is capable of inhibiting collision of the lens barrel with the cover and thus of inhibiting deformation and damage to the lens barrel and/or the cover.

In order to stabilize the performance of a liquid lens, which is included in a camera module mounted on the front surface of a mobile device, for example, a cellular phone, the size of the liquid lens may be increased. When the size of the liquid lens is increased for this reason, the size of a holder, in which the liquid lens is seated, may also be increased, and the size of the reception space in a lens barrel, in which the holder is fitted or mounted, may also be increased.

However, when only the size of the reception space is increased without increasing the size of the lens barrel due to restrictions on the size of the camera module mounted on the front surface of the cellular phone, the thickness of a portion of the lens barrel, for example, a second lens unit may be decreased, and thus the strength of the lens barrel may be decreased. When the strength of the lens barrel is decreased, the lens barrel may undergo deformation or damage caused by external force during assembly of the lens barrel with the lens assembly and assembly of the lens barrel with the lens holder, thereby deteriorating the performance and the reliability of the camera module.

The embodiments are capable of increasing the strength of the lens barrel 110 without increasing the size of the camera module by forming the stepped portion 510 at the lens barrel 110, thereby inhibiting deformation of the lens barrel caused by application of external force during an assembly process and inhibiting deterioration of the reliability of the camera module.

The liquid lens 50 may have an inflection point, which occurs depending on temperature characteristics. In order to improve the inflection point of the liquid lens 50, the liquid lens 50 may include a temperature sensor for measuring the temperature of the liquid lens 50. The temperature information obtained by the temperature sensor, may be supplied to the controller of the camera module, for example, a driver IC. In order to optimize the inflection point of the liquid lens, the driver IC may control drive signals using the temperature information.

In order to inhibit deterioration in the performance of the liquid lens 50 due to a decrease in the temperature of the liquid lens 50, the liquid lens 50 may include a heater configured to control the temperature of the liquid lens 50.

The liquid lens 50 according to the embodiment may include the four upper electrodes 51 to 54, which are exposed from the first surface (for example, the upper surface) of the liquid lens 50, and one lower electrode (for example, 50d), which is exposed from the second surface (for example, the lower surface) of the liquid lens 50, in order to receive four separate drive signals for deforming the interface between the first liquid and the second liquid.

Furthermore, the liquid lens according to the embodiment may include three lower electrodes (for example, 50a, 50b and 50c), which receive drive signals for driving the heater of the liquid lens 50 and are exposed from the second surface of the liquid lens 50 in order to output the output of the temperature sensor of the liquid lens 50. Here, one (for example, 50a) of the three lower electrodes (for example, 50a, 50b and 50c) may be a common electrode, for example, a common negative electrode for the heater and the temperature sensor.

The first lens unit 130 according to the embodiment may include four terminals 61-1 to 61-4, which are conductively connected to the four upper electrodes 51 to 54 of the liquid lens 50, and the four terminals 62-1 to 62-4, which are conductively connected to the four lower electrodes 50a to 50d of the liquid lens 50.

The first lens unit 130 according to the embodiment may include an electrode structure and a terminal structure, which are capable of controlling the interface of the liquid lens region of the liquid lens 50, which includes the temperature sensor and the heater, of driving the heater, and of outputting the detection signal of the temperature sensor.

By virtue of the electrode structure and the terminal structure, the embodiment is capable of facilitating an operation of conductively connecting the electrodes 51 to 54 and 50a to 50d of the liquid lens 50 to the terminals 61-1 to 61-4 and 62-1 to 62-4 and of decreasing the external size of the first lens unit 130.

The camera module 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image.

For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 15:
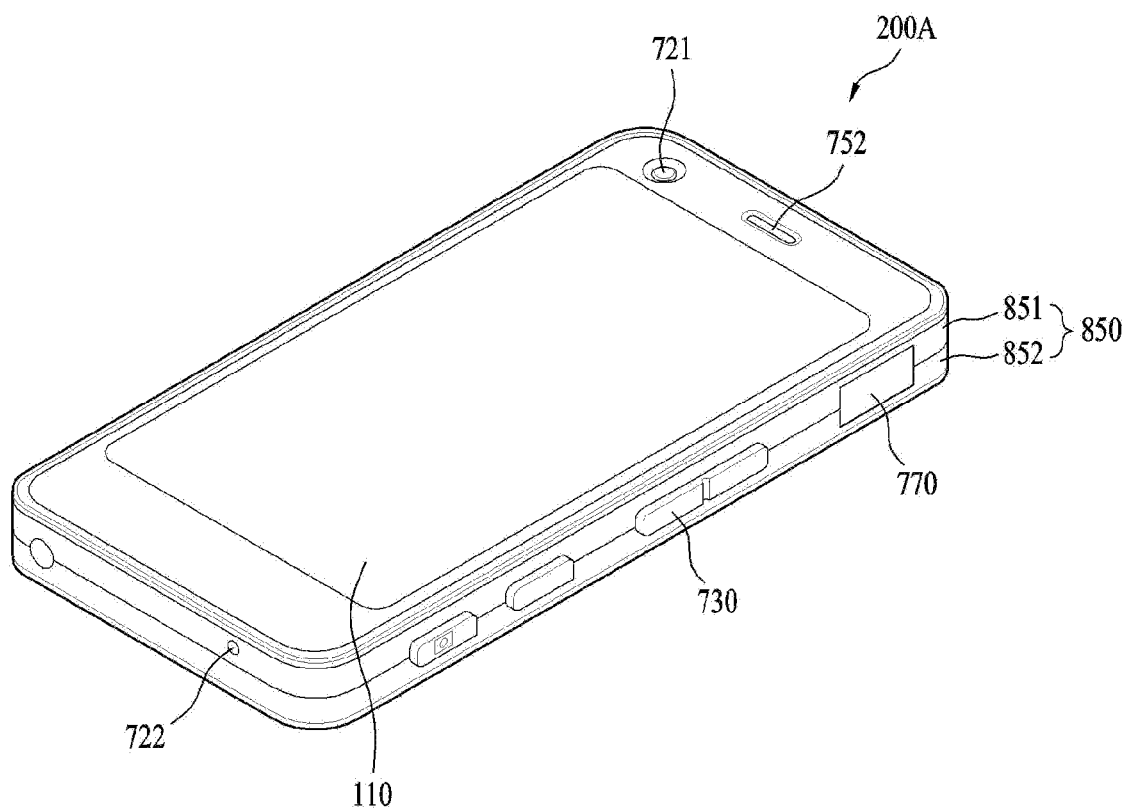
FIG. 15 is a perspective view of a portable terminal according to an embodiment.
Figure 16:
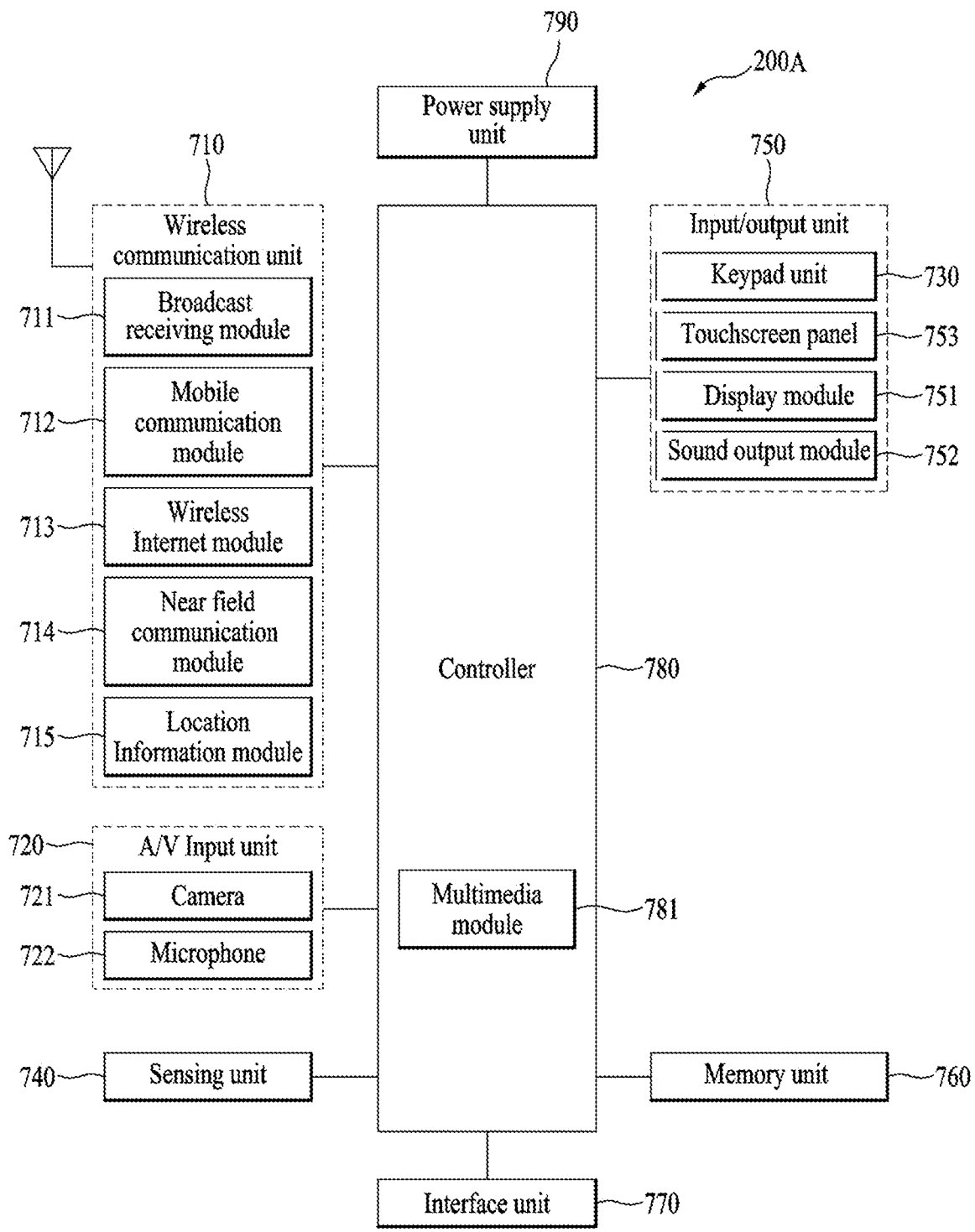
FIG. 16 is a view illustrating the configuration of the portable terminal shown in FIG. 15.

FIG. 15 is a perspective view illustrating a portable terminal 200A according to an embodiment. FIG. 16 is a view illustrating the configuration of the portable terminal 200A illustrated in FIG. 15.

Referring to FIGS. 15 and 16, the portable terminal (hereinafter, referred to as a "terminal") 200A may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 15 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 100.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

Embodiments are applicable to a camera module and an optical device, which are capable of controlling the interface of a liquid lens of a first lens unit, of providing electrodes and terminals capable of outputting the output of a temperature sensor, of facilitating an operation of conductively connecting the electrodes of the liquid lens to terminals, and of decreasing the external size of a first lens unit.

The invention claimed is:

1. A camera module comprising:
a circuit board;
a sensor base disposed on the circuit board;
a lens holder disposed on the sensor base;
a lens barrel coupled to the lens holder; and
a first lens unit disposed in the lens barrel,
wherein the first lens unit includes:
  a holder;
  a liquid lens disposed in the holder and including an upper electrode and a lower electrode; and
  a terminal comprising a first terminal disposed at the holder and conductively connected to the upper electrode and a second terminal disposed at the holder and conductively connected to the lower electrode,
wherein the upper electrode includes a first upper electrode, a second upper electrode, a third upper electrode, and a fourth upper electrode, which are spaced apart from one another,
wherein the lower electrode includes a first lower electrode, a second lower electrode, a third lower electrode, and a fourth lower electrode,
wherein the first lower electrode is a first common electrode for the upper electrode,
wherein the second lower electrode is a second common electrode for the third lower electrode and the fourth lower electrode,
wherein the first terminal comprises:
  a first of first terminal and a second of first terminal, which are disposed at one side of the holder; and
  a third of first terminal and a fourth of first terminal, which are disposed at another side of the holder, and
wherein the second terminal comprises:
  a first of second terminal and a second of second terminal, which are disposed at the one side of the holder and disposed between the first of first terminal and the second of first terminal; and
  a third of second terminal and a fourth of second terminal, which are disposed at the another side of the holder and disposed between the third of first terminal and the fourth of first terminal.

2. The camera module according to claim 1, wherein the liquid lens includes a first liquid and a second liquid, and a drive signal is applied between the upper electrode and the first common electrode so as to deform an interface between the first liquid and the second liquid.

3. The camera module according to claim 1, wherein the liquid lens includes a heater configured to control a temperature of the liquid lens, and the third lower electrode and the second common electrode are conductively connected to the heater.

4. The camera module according to claim 1, wherein the liquid lens includes a temperature sensor configured to measure a temperature of the liquid lens, and the fourth lower electrode and the second common electrode are conductively connected to the temperature sensor.

5. The camera module according to claim 1, wherein the terminal includes a connecting terminal connecting the lower electrode to the second terminal.

6. The camera module according to claim 5, wherein one end of the first terminal is coupled to the upper electrode, and a remaining end of the first terminal projects from a side surface of the holder, and
wherein one end of the second terminal is coupled to the connecting terminal, and a remaining end of the second terminal projects from the side surface of the holder.

7. The camera module according to claim 6, wherein the first terminal includes:
a first portion coupled to the upper electrode;
a second portion projecting from the side surface of the holder; and
a third portion, which connects the first portion to the second portion and is disposed on the side surface of the holder, and
wherein at least a portion of the first portion overlaps at least a portion of the upper electrode in an optical-axis direction.

8. The camera module according to claim 5, wherein the second terminal includes:
a first portion coupled to the connecting terminal;
a second portion projecting from the side surface of the holder; and
a third portion, which connects the first portion to the second portion and is disposed on the side surface of the holder.

9. The camera module according to claim 1, comprising second and third lens units disposed in the lens barrel, and wherein the first lens unit is disposed between the second lens unit and the third lens unit.

10. The camera module according to claim 1, comprising an electric connection member disposed on the lens holder and coupled to the terminal by a conductive adhesive.

11. A camera module comprising:
a holder;
a liquid lens disposed in the holder and comprising a first electrode and a second electrode; and
a terminal disposed at the holder and connecting the first electrode to the second electrode,
wherein the first electrode comprises a plurality of first electrodes disposed on one surface of the liquid lens and are spaced apart from each other, wherein the second electrode comprises a plurality of second electrodes disposed on an other surface opposite the one surface of the liquid lens and spaced apart from each other, wherein one of the second electrodes is a first common electrode for the first electrode, wherein the terminal comprises a first terminal disposed at the holder and conductively connected to the first electrode and a second terminal disposed at the holder and conductively connected to the second electrode, wherein the first terminal comprises:
- a first of first terminal and a second of first terminal, which are disposed at one side of the holder; and
- a third of first terminal and a fourth of first terminal, which are disposed at another side of the holder, and wherein the second terminal comprises:
- a first of second terminal and a second of second terminal, which are disposed at the one side of the holder and disposed between the first of first terminal and the second of first terminal; and
- a third of second terminal and a fourth of second terminal, which are disposed at the another side of the holder and disposed between the third of first terminal and the fourth of first terminal.

12. The camera module according to claim 11, wherein another of the second electrodes is a second common electrode for an other two second electrodes.

13. The camera module according to claim 12, wherein the first electrodes are disposed on the upper surface of the liquid lens, and the second electrodes are disposed on the lower surface of the liquid lens.

14. The camera module according to claim 12, wherein the first electrodes comprise a first of first electrode, a second of first electrode, a third of first electrode, and a fourth of first electrode, and
the second electrodes comprises a first of second electrode, a second of second electrode, a third of second electrode, and a fourth of second electrode.

15. The camera module according to claim 14, wherein the first of second electrode is the first common electrode, the second of second electrode is the second common electrode, and the other two second electrodes are the third of second electrode and the fourth of second electrode.

16. The camera module according to claim 15, wherein the terminal comprises:
- a first terminal connected to the first electrodes; and
- a second terminal connected to the second electrodes, wherein the first terminal comprises:
- a first of first terminal and a second of first terminal, which are disposed at one side of the holder; and
- a third of first terminal and a fourth of first terminal, which are disposed at another side of the holder, and wherein the second terminal comprises:
- a first of second terminal and a second of second terminal, which are disposed at the one side of the holder; and
- a third of second terminal and a fourth of second terminal, which are disposed at the another side of the holder.

17. A camera module comprising:
a circuit board;
a sensor base disposed on the circuit board;
a lens holder disposed on the sensor base;
a lens barrel coupled to the lens holder; and
a first lens unit disposed in the lens barrel,
wherein the first lens unit includes:
- a holder;
- a liquid lens disposed in the holder and comprising an upper electrode and a lower electrode; and
- a terminal comprising a first terminal disposed at the holder and is conductively connected to the upper electrode and a second terminal disposed at the holder and conductively connected to the lower electrode, wherein the upper electrode comprises a plurality of electrodes, wherein the lower electrode comprises a common electrode for the upper electrode, wherein the first terminal comprises:
- a first of first terminal and a second of first terminal, which are disposed at one side of the holder; and
- a third of first terminal and a fourth of first terminal, which are disposed at another side of the holder, and wherein the second terminal comprises:
- a first of second terminal and a second of second terminal, which are disposed at the one side of the holder and disposed between the first of first terminal and the second of first terminal; and
- a third of second terminal and a fourth of second terminal, which are disposed at the another side of the holder and disposed between the third of first terminal and the fourth of first terminal.

* * * * *